United States Patent
McCarthy

(10) Patent No.: US 11,765,207 B1
(45) Date of Patent: Sep. 19, 2023

(54) DECLARING NETWORK POLICIES USING NATURAL LANGUAGE

(71) Applicant: strongDM, Inc., New York, NY (US)

(72) Inventor: Justin Allan McCarthy, Redwood City, CA (US)

(73) Assignee: strongDM, Inc., New York, NY (US)

( * ) Notice: Subject to any disclaimer, the term of this patent is extended or adjusted under 35 U.S.C. 154(b) by 0 days.

(21) Appl. No.: 18/131,151

(22) Filed: Apr. 5, 2023

Related U.S. Application Data

(60) Provisional application No. 63/452,865, filed on Mar. 17, 2023.

(51) Int. Cl.
| | | |
|---|---|---|
| *H04L 29/00* | (2006.01) | |
| *H04L 9/40* | (2022.01) | |
| *G06F 40/40* | (2020.01) | |

(52) U.S. Cl.
CPC ............ *H04L 63/205* (2013.01); *G06F 40/40* (2020.01); *H04L 63/102* (2013.01)

(58) Field of Classification Search
CPC ...... H04L 63/205; H04L 63/102; G06F 40/40
See application file for complete search history.

(56) References Cited

U.S. PATENT DOCUMENTS

| | | | |
|---|---|---|---|
| 7,233,569 B1 | 6/2007 | Swallow | |
| 7,752,466 B2 | 7/2010 | Ginter et al. | |
| 7,886,339 B2 | 2/2011 | Keohane et al. | |
| 8,102,814 B2 | 1/2012 | Rahman et al. | |
| 8,135,815 B2 * | 3/2012 | Mayer | H04L 67/10 709/221 |
| 9,082,402 B2 * | 7/2015 | Yadgar | G10L 15/19 |
| 9,178,793 B1 | 11/2015 | Marlow | |
| 9,239,834 B2 | 1/2016 | Donabedian et al. | |
| 9,300,635 B1 | 3/2016 | Gilde et al. | |
| 9,632,828 B1 | 4/2017 | Mehta et al. | |
| 9,800,517 B1 | 10/2017 | Anderson | |

(Continued)

OTHER PUBLICATIONS

Office Communication for U.S. Appl. No. 17/733,735 dated Jul. 12, 2022, pp. 1-38.

(Continued)

*Primary Examiner* — Don G Zhao
(74) *Attorney, Agent, or Firm* — John W. Branch; Branch Partners PLLC

(57) ABSTRACT

Embodiments are directed to declaring network policies using natural language. A policy statement for the management of the network resources may be generated based on a statement. A prompt dataset may be generated for large language models based on the policy statement and a prompt template. In response to providing the prompt dataset to train the large language models further actions may be performed, including: generating a candidate configuration profile based on information provided by the trained large language models such that the candidate configuration profile may include field names or field values that may be associated with providing the management of the network resources; in response to validation of the candidate configuration profile for the management of the network resources, the validated candidate configuration profile may be provided to an infrastructure security computer (ISC) such that the ISC updates network policies based on the validated candidate configuration profile.

30 Claims, 14 Drawing Sheets

(56) References Cited

U.S. PATENT DOCUMENTS

| | | |
|---|---|---|
| 10,075,334 B1 | 9/2018 | Kozura et al. |
| 10,110,593 B2 | 10/2018 | Karroumi et al. |
| 10,117,098 B1 | 10/2018 | Naguthanawala et al. |
| 10,735,263 B1 | 8/2020 | McAlary et al. |
| 11,075,747 B1 | 7/2021 | Holsman |
| 11,102,147 B2 | 8/2021 | Mehta et al. |
| 11,290,143 B1 | 3/2022 | Sternowski |
| 11,316,822 B1 | 4/2022 | Gawade et al. |
| 11,323,919 B1 | 5/2022 | Parulkar et al. |
| 11,375,300 B2 | 6/2022 | Sagie et al. |
| 11,412,051 B1 | 8/2022 | Chiganmi et al. |
| 11,528,147 B2 | 12/2022 | Madisetti et al. |
| 11,546,323 B1 | 1/2023 | Jones et al. |
| 11,546,763 B1 | 1/2023 | Cirello Filho et al. |
| 11,599,714 B2* | 3/2023 | Munro .................... G06F 40/42 |
| 11,599,841 B2* | 3/2023 | Anisingaraju ....... G06F 16/3344 |
| 11,620,103 B2* | 4/2023 | Graham ................. G06F 3/165 |
| | | 715/727 |
| 2005/0164650 A1 | 7/2005 | Johnson |
| 2005/0209876 A1* | 9/2005 | Kennis ............ G06Q 10/06393 |
| | | 726/1 |
| 2006/0190991 A1 | 8/2006 | Iyer |
| 2006/0212487 A1* | 9/2006 | Kennis ................... G06Q 40/00 |
| 2006/0240824 A1 | 10/2006 | Henderson et al. |
| 2006/0288204 A1 | 12/2006 | Sood et al. |
| 2007/0009104 A1 | 1/2007 | Renkis |
| 2009/0037607 A1 | 2/2009 | Farinacci et al. |
| 2009/0164663 A1 | 6/2009 | Ransom et al. |
| 2009/0222559 A1 | 9/2009 | Anipko et al. |
| 2011/0225311 A1 | 9/2011 | Liu et al. |
| 2013/0173794 A1 | 7/2013 | Agerbak et al. |
| 2013/0198558 A1 | 8/2013 | Rao et al. |
| 2013/0268260 A1* | 10/2013 | Lundberg ............ G06F 11/3664 |
| | | 704/8 |
| 2014/0044265 A1 | 2/2014 | Kocher et al. |
| 2014/0057676 A1 | 2/2014 | Lord et al. |
| 2014/0136970 A1* | 5/2014 | Xiao ........................ G06F 40/40 |
| | | 715/271 |
| 2015/0127949 A1 | 5/2015 | Patil et al. |
| 2015/0135300 A1 | 5/2015 | Ford |
| 2015/0208273 A1* | 7/2015 | Raleigh ................. H04M 15/66 |
| | | 370/235 |
| 2015/0281952 A1 | 10/2015 | Patil et al. |
| 2015/0382198 A1 | 12/2015 | Kashef et al. |
| 2016/0014669 A1 | 1/2016 | Patil et al. |
| 2016/0014818 A1 | 1/2016 | Reitsma et al. |
| 2016/0080128 A1 | 3/2016 | Hebron et al. |
| 2016/0173501 A1 | 6/2016 | Brown |
| 2016/0180102 A1 | 6/2016 | Kim et al. |
| 2016/0262021 A1 | 9/2016 | Lee et al. |
| 2016/0294826 A1 | 10/2016 | Han et al. |
| 2017/0061956 A1* | 3/2017 | Sarikaya .................. G06N 5/01 |
| 2017/0111368 A1 | 4/2017 | Hibbert et al. |
| 2017/0126734 A1 | 5/2017 | Harney |
| 2017/0142810 A1 | 5/2017 | Cho |
| 2017/0279971 A1 | 9/2017 | Raleigh et al. |
| 2017/0339561 A1 | 11/2017 | Wennemyr et al. |
| 2017/0364505 A1* | 12/2017 | Sarikaya ................ G06F 40/289 |
| 2017/0372087 A1 | 12/2017 | Lee |
| 2018/0061158 A1 | 3/2018 | Greene |
| 2018/0123957 A1 | 5/2018 | Chen et al. |
| 2018/0167373 A1 | 6/2018 | Anderson et al. |
| 2018/0233141 A1* | 8/2018 | Solomon ............... A61B 5/7475 |
| 2018/0288026 A1 | 10/2018 | Callaghan |
| 2018/0359369 A1 | 12/2018 | Golshenas et al. |
| 2018/0367308 A1 | 12/2018 | Kacin et al. |
| 2019/0039569 A1 | 2/2019 | Reed et al. |
| 2019/0075095 A1 | 3/2019 | Venable et al. |
| 2019/0104411 A1 | 4/2019 | Hotchkiss et al. |
| 2019/0116132 A1 | 4/2019 | Suzuki |
| 2019/0124507 A1 | 4/2019 | Dotchkoff et al. |
| 2019/0147154 A1 | 5/2019 | Das |
| 2019/0349758 A1 | 11/2019 | Zhu et al. |
| 2020/0219023 A1 | 7/2020 | Duchastel |
| 2020/0220848 A1 | 7/2020 | Patwardhan |
| 2020/0257179 A1 | 8/2020 | Barnum et al. |
| 2020/0267552 A1 | 8/2020 | Lee et al. |
| 2020/0272911 A1* | 8/2020 | Quiros Araya ......... G06F 16/93 |
| 2020/0296779 A1 | 9/2020 | Moghe et al. |
| 2020/0322286 A1 | 10/2020 | Mehta et al. |
| 2020/0323030 A1 | 10/2020 | Mehta et al. |
| 2020/0382488 A1 | 12/2020 | Liu et al. |
| 2021/0056524 A1 | 2/2021 | Isgar |
| 2021/0056536 A1 | 2/2021 | Carter et al. |
| 2021/0091941 A1 | 3/2021 | Pancras et al. |
| 2021/0168661 A1 | 6/2021 | Wong et al. |
| 2021/0211423 A1 | 7/2021 | Tan et al. |
| 2021/0223128 A1 | 7/2021 | Kirch |
| 2021/0224091 A1 | 7/2021 | Hayatnagarkar et al. |
| 2021/0226910 A1 | 7/2021 | Ranpise et al. |
| 2021/0281572 A1* | 9/2021 | Fernandez-Spadaro ..................... |
| | | H04L 63/083 |
| 2021/0294970 A1* | 9/2021 | Bender ................ G06F 40/289 |
| 2021/0306310 A1 | 9/2021 | Tan |
| 2021/0314399 A1 | 10/2021 | Hyun et al. |
| 2021/0344492 A1 | 11/2021 | Goodsitt et al. |
| 2022/0007437 A1 | 1/2022 | Goenka et al. |
| 2022/0038544 A1 | 2/2022 | Grinstein et al. |
| 2022/0052850 A1 | 2/2022 | Fagan et al. |
| 2022/0086639 A1 | 3/2022 | Lu et al. |
| 2022/0150312 A1 | 5/2022 | Ranpise et al. |
| 2022/0159029 A1 | 5/2022 | Bendersky et al. |
| 2022/0217084 A1 | 7/2022 | Arora et al. |
| 2022/0263913 A1 | 8/2022 | Zhang et al. |
| 2022/0294540 A1 | 9/2022 | Black et al. |
| 2022/0311767 A1 | 9/2022 | Ouellet |
| 2022/0329477 A1 | 10/2022 | Chiganmi et al. |
| 2022/0334864 A1 | 10/2022 | K N et al. |
| 2023/0027507 A1 | 1/2023 | He et al. |
| 2023/0032790 A1 | 2/2023 | Mahajan et al. |
| 2023/0059173 A1 | 2/2023 | Moon |
| 2023/0067223 A1 | 3/2023 | Freed et al. |
| 2023/0153447 A1* | 5/2023 | Kapadia ................ G06F 21/604 |
| | | 726/26 |

OTHER PUBLICATIONS

Office Communication for U.S. Appl. No. 17/733,735 dated Nov. 1, 2022, pp. 1-7.

Office Communication for U.S. Appl. No. 17/889,788 dated Nov. 7, 2022, pp. 1-12.

Office Communication for U.S. Appl. No. 17/954,697 dated Jan. 20, 2023, pp. 1-13.

Office Communication for U.S. Appl. No. 18/094,858 dated Mar. 16, 2023, pp. 1-10.

Office Communication for U.S. Appl. No. 18/091,006 dated Mar. 31, 2023, pp. 1-12.

Office Communication for U.S. Appl. No. 17/900,121 dated Apr. 4, 2023, pp. 1-13.

Office Communication for U.S. Appl. No. 18/091,895 dated Apr. 5, 2023, pp. 1-12.

Office Communication for U.S. Appl. No. 18/091,006 dated Apr. 19, 2023, pp. 1-9.

\* cited by examiner

700

702

704 — Given the profile object with fields "resourceType":string, "resourceTags":array, "userName":string, "userRole":string, "location":string 706 — Follow these instructions precisely.
Do not write explanations.
Only ouput valid Javascript syntax.
Output only valid, professional, high quality code.
Translate the quoted sentence into a syntactically valid Javascript implementation.
Do not write explanations.
Omit userRole if it is unknown.
Omit location if it is unknown.
The name of the generated object is always "access".

708 — Here is an example for the sentence: Allow access to Oracle databases in the EU region, where the user's name is John with a role of admin

```
const access = {
      resourceType: = "database",
      resourceTags: ["oracle"],
      userName: = "John",
      userRole: "admin"
      location: "EU"
};
```

710 — Here is the target sentence:

$POLICY_STATEMENT

712 — Include no other conditions.

*Fig. 7*

DECLARING NETWORK POLICIES USING NATURAL LANGUAGE

CROSS-REFERENCE TO RELATED APPLICATION

This application is a Utility Patent application based on previously filed U.S. Provisional Patent Application U.S. Ser. No. 63/452,865 filed on Mar. 17, 2023, the benefit of the filing date of which is hereby claimed under 35 U.S.C. § 119(e), and the contents of which is further incorporated in entirety by reference.

TECHNICAL FIELD

The present invention relates generally to network security, and more particularly, but not exclusively, to declaring network policies using natural language.

BACKGROUND

As organizations become increasingly dependent on networked environments, remote services, distributed services, or the like, managing and monitoring infrastructure access in networked environments can become both critically important and more difficult. Difficulties in managing network environments may not be new, however, interconnections among remote offices, data centers, remote employees, remote customers, and so on, have resulted in organizations relying more broadly on heterogeneous distributed networked services, or the like. Also, in some cases, regulatory environment has been adapting to the increase in computer-based services. Accordingly, organizations may be required to comply with regulatory regimes from multiple jurisdictions related to various critical subjects, such as, finance, privacy, employee rights, cross jurisdiction taxation, and so on. The combination of the increase in reliance on distributed and networked services and ongoing changes in regulatory environments has tended to elevate the importance of managing and monitoring infrastructure access in networked environments both for operations as well as compliance with various regulatory regimes. Accordingly, administrators may be tasked with generate configuration profiles that correspond to the application of network policies. Generally, as the complexity of network policies increases the complexity of configuration profiles often increase as well. Accordingly, generating configuration profiles directed to complex network security policies may be error-prone because the underlying network security or the protected networks may be increasing complex. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 7 illustrates a prompt template for declaring network policies using natural language in accordance with one or more of the various embodiments;

DETAILED DESCRIPTION OF VARIOUS EMBODIMENTS

Figure 1:
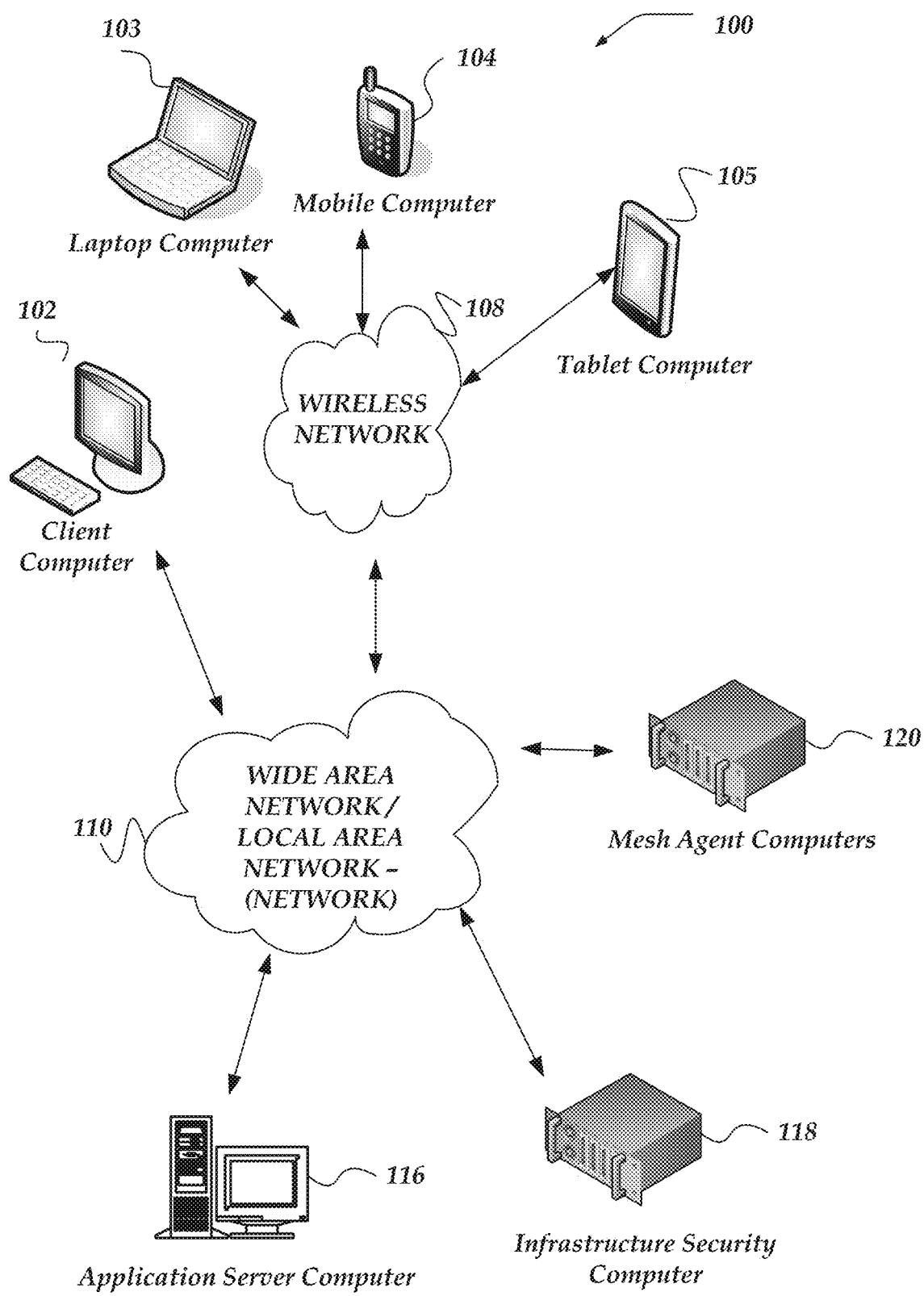
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java, PHP, Perl, Python, R, Julia, JavaScript, Ruby, VBScript, Microsoft .NET languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints in a networked environment. A session is set up or established at a certain point in time and torn down at a later point in time. An established communication session may involve more than one message in each direction. A session may have stateful communication where at least one of the communicating endpoints saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

As used herein, the term "tuple" refers to a set of values that identify a source and destination of a network communication or network traffic packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the terms "large language model," or "LLM" refer to data structures, programs, or the like, that may be designed to interpret natural language. Typically, LLMs may generate text responses in response to text based prompts. Often, LLMs may be considered to be neural networks that have been trained on large collections of natural language source documents. Accordingly, in some cases, LLMs may be trained to generate predictive responses based on provided prompts. LLM prompts may include context information, examples, or the like, that may enable LLMs to generate responses directed to specific queries.

As used herein, the term "prompt dataset" refer to one or more data structures that contain or represent prompt information that may be provided the LLMs.

As used herein, the term "configuration profile" refers to one or more data structures that includes information for declaring or defining one or more characteristics or features or a network management policy. Accordingly, configuration profiles may be part of a network management policy. For example, in some cases, configuration profiles may be used to declare which network resources a user may access.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to declaring network policies using natural language. In one or more of the various embodiments, a user interface may be displayed that displays a statement from a user for management of one or more network resources such that a policy statement for the management of the one or more network resources may be generated based on the statement.

In one or more of the various embodiments, a prompt dataset may be generated for one or more large language models based on the policy statement and a prompt template such that the prompt template may include one or more of a field name, an exemplar field value, an exemplar policy statement, an exemplar configuration profile, or the like.

In one or more of the various embodiments, in response to providing the prompt dataset to train the one or more large language models further actions may be performed, including: generating a candidate configuration profile based on information provided by the one or more trained large language models such that the candidate configuration profile may include one or more field names or one or more field values that may be associated with providing the management of the one or more network resources; in response to validation of the candidate configuration profile for the management of the one or more network resources, the validated candidate configuration profile may be provided to an infrastructure security computer (ISC) such that the ISC updates one or more network policies based on the validated candidate configuration profile; or the like.

In one or more of the various embodiments, in response to invalidating of the candidate configuration profile for the management of the one or more network resources, the one or more large language models may be retrained with one or more other candidate configuration profiles based on one or more other prompt datasets generated with one or more other policy statements associated with one or more other statements provided by the user; in response to validation of the one other candidate configuration profiles for the management of the one or more network resources, the validated other candidate configuration profile may be provided to the infrastructure security computer (ISC) such that the ISC updates the one or more network policies based on the validated other candidate configuration profile.

In one or more of the various embodiments, providing the statement may include: providing one or more of a text statement or an audio statement from the user to the user interface; determining one or more reserved words or reserved characters included in the statement based on one or more of a heuristic, a pattern match, natural language processing (NLP), or a machine learning model; or the like.

In one or more of the various embodiments, the policy statement may be compared to one or more previously employed policy statements; in response to the policy statement matching the one or more previously employed policy statements, additional actions may be performed, including: determining one or more previously employed configuration profiles that may correspond to the one or more matched policy statements; providing the one or more previously employed configuration profiles to the ISC; or the like.

In one or more of the various embodiments, one or more metrics associated with the one or more large language models may be generated such that the one or more metrics may be modified based on the validation of the candidate configuration profile or invalidation of the candidate configuration profile. In one or more of the various embodiments, in response to the one or more metrics having a value below a threshold value, one or more notifications associated with the one or more large language models that correspond to the one or more metrics that have a value below the threshold value may be generated.

In one or more of the various embodiments, one or more metrics associated with the prompt template may be generated such that the one or more metrics may be modified based on the validation or invalidation of the candidate configuration profile. In one or more of the various embodiments, in response to the one or more metrics having a value below a threshold value, one or more notifications that indicate that the prompt template is deficient may be generated.

In one or more of the various embodiments, determining the prompt template, may further include: determining one or more characteristics associated with the one or more network resources such that the one or more characteristic may include one or more of a resource class, a user role, an application type, a geographic region, or the like. In one or more of the various embodiments, the prompt template may be determined from a plurality of stored prompt templates based on the one or more characteristics.

In one or more of the various embodiments, the policy statement may be compared to one or more previously employed policy statements. In one or more of the various embodiments, in response to the policy statement matching the one or more previously employed policy statements, additional actions may be performed, including: determining one or more previously employed configuration profiles that may correspond to the one or more matched policy statements; comparing the candidate configuration profile to the one or more previously employed configuration profiles; in response a mismatch between the candidate configuration profile and the one or more previously employed configuration profiles, another report may be generated that includes information associated with the mismatch.

In one or more of the various embodiments, a report for the one or more updated network policies may be displayed in user interface such that the report includes one or more interactive visualizations that may display one or more representations of the one or more network resources.

In one or more of the various embodiments, the statement may include, one or more task descriptions for the management of the one or more network resources.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)-(network) 110, wireless network 108, client computers 102-105, application server computer 116, infrastructure security computer 118, one or more mesh agent computers 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to infrastructure security computer 118. Also, client computers may be arranged to enable users to display reports, interactive user-interfaces, results provided by network monitor computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, infrastructure security computer 118, mesh agent computers 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, infrastructure security computer 118, and mesh agent computers 120 are described in more detail below in conjunction with FIG. 3. Although FIG. 1 illustrates application server computer 116, infrastructure security computer 118, and mesh agent computers 120 each as a single computer, the innovations or embodiments are not so limited. For example, one or more functions of application server computer 116, infrastructure security computer 118, and mesh agent computers 120, or the like, may be distributed across one or more distinct network computers. Moreover, in one or more embodiments, infrastructure security computer 118 may be implemented using a plurality of network computers. Further, in one or more of the various embodiments, application server computer 116, infrastructure security computer 118, or mesh agents 120 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
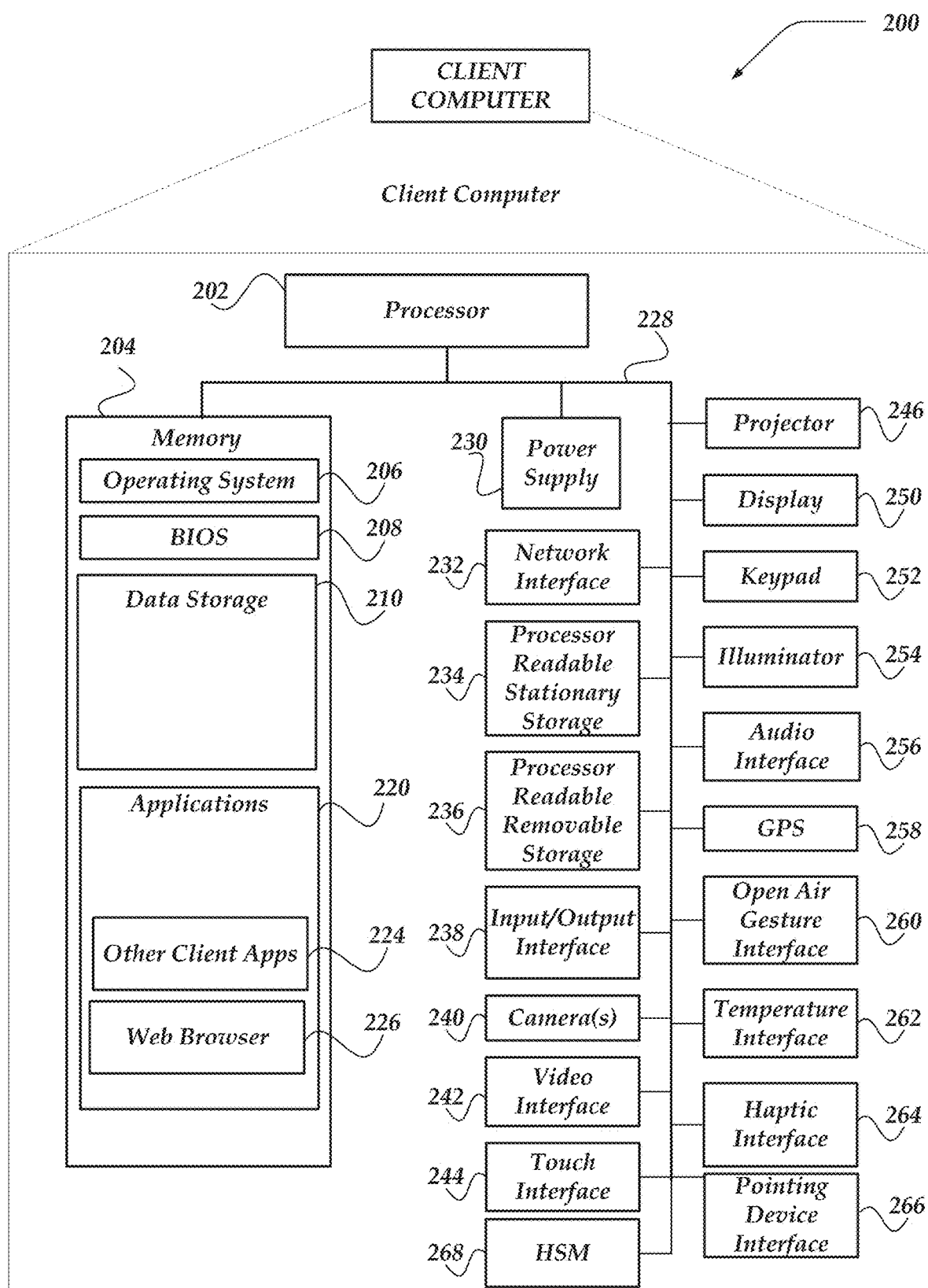
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth, Zigbee, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, mesh agent 222, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
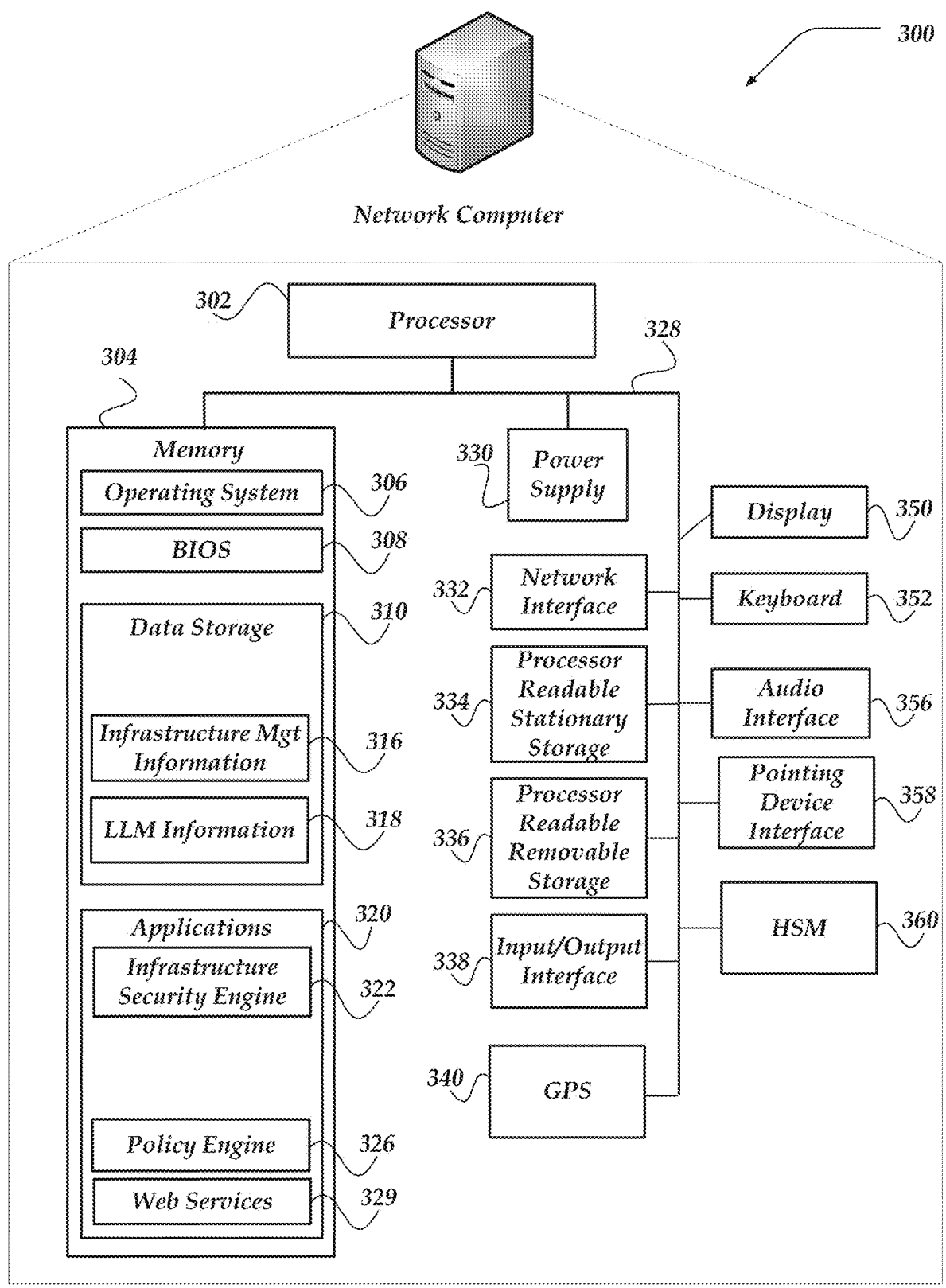
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, infrastructure security computer 118, or mesh agent computers 120 FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the network computer or client computers, including for example, a Media Access Control (MAC) address, IP address, and the like.

In at least one of the various embodiments, applications, such as, operating system 306, overlay network engine 322, mesh agent 324, policy engine 326, web services 329, or the like, may be arranged to employ geo-location information to select one or more localization features, such as, time zones, languages, currencies, calendar formatting, or the like. Also, localization features may be used when interpreting network traffic, application protocols, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, overlay network information 314, infrastructure management information 316, large language model information 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include overlay infrastructure security engine 322, mesh agent 324, policy engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, infrastructure security engine 322, mesh agent 324, policy engine 326, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to infrastructure security engine 322, mesh agent 324, policy engine 326, web services 329, or the like, may be provisioned and de-commissioned automatically.

Also, in one or more of the various embodiments, infrastructure security engine 322, mesh agent 324, policy engine 326, web services 329, or the like, may be located in virtual servers running in a cloud-based computing environment rather than being tied to one or more specific physical network computers. Likewise, in some embodiments, one or more of infrastructure security engine 322, mesh agent 324, policy engine 326, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
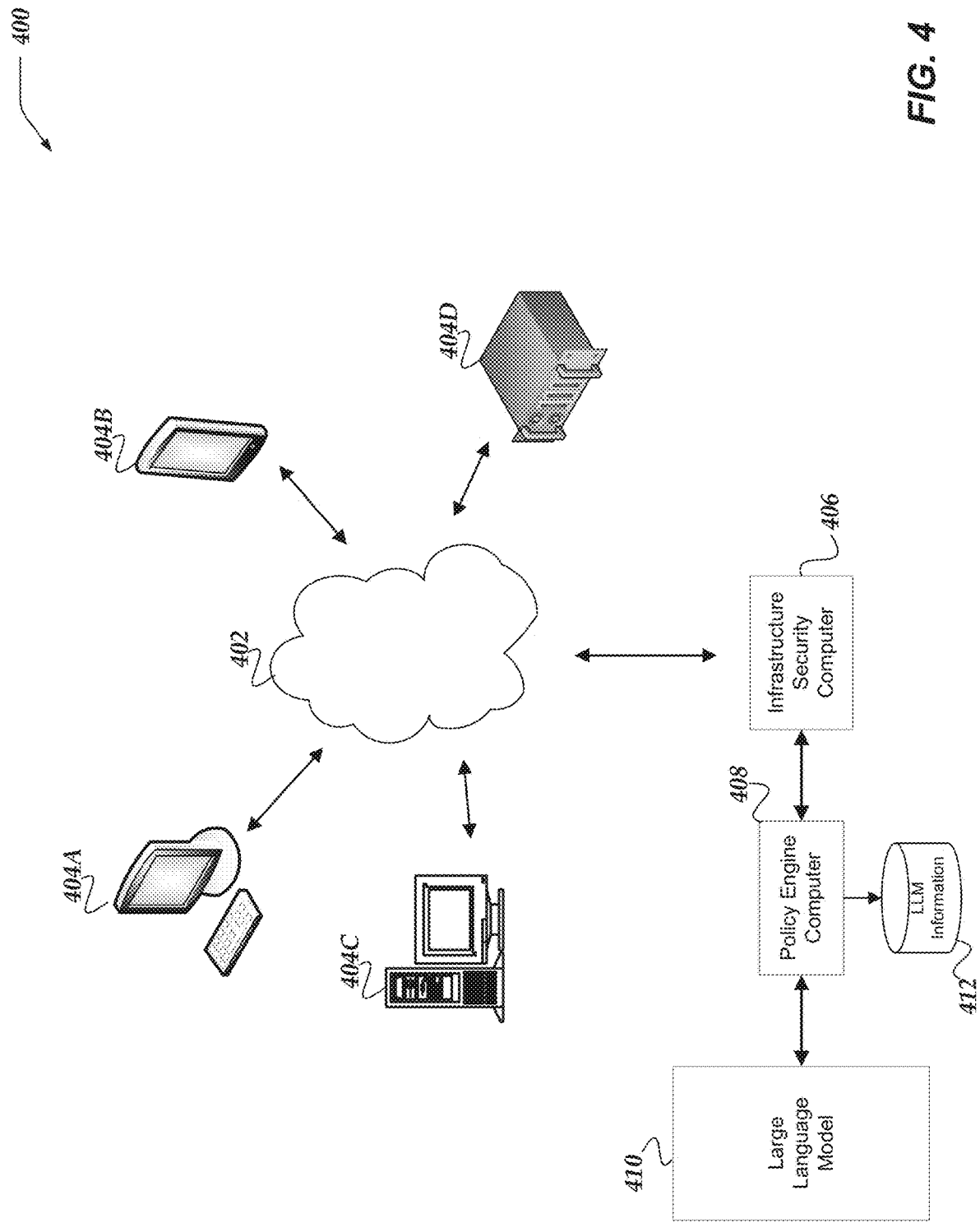
FIG. 4 illustrates a logical architecture of a system for declaring network policies using natural language in accordance with one or more of the various embodiments.

FIG. 4 illustrates a logical architecture of system 400 for declaring network policies using natural language in accordance with one or more of the various embodiments. In some embodiments, system 400 may comprise network 402 which may be configured to communicatively couple various network entities such as network computers, client computers, or other network devices as represented here by client computer 404A, tablet computer 404B, desktop computer 404C, server computer 404D.

In some embodiments, network 402 may be considered to be a network similar to network 108 or network 110 as described above for FIG. 1. Likewise, in some embodiments, computers or devices such as client computer 404A, tablet computer 404B, desktop computer 404C, server computer 404D may be considered to be similar to network computer 300 or client computer 200 described above.

In one or more of the various embodiments, it may be advantageous for organizations to define various network policies, network security policies, access rules, or the like, that may be used to enforce access rights, access privileges, or the like, for various users, services, or the like, that may be active in protected networks or protected hosts. Also, in some cases, one or more network policies may be limited to or otherwise applicable to a single host or computer. For example, an application access policy may be directed to configuring application access on a single computer absent consideration of a network. For brevity or clarity network policies, access policies, network security policies, access rules, or the like, may be collectively referred to herein as network policies.

In one or more of the various embodiments, organizations may employ infrastructure security systems that enable network administrators to establish or enforce network policies for one or more networks. Network policies may be directed to network entities, users, user roles, individual/separate network/sub-networks, or the like. Further, in some embodiments, configuration profiles may be employed to declare or define the particular network policy for users, entities, network, sub-networks, applications, services, or the like. For example, a user's configuration profile may declare which services, applications, computers, or the like, may be accessible by the user. Likewise, in some embodiments, configuration profiles may be associated with various computers, applications, services, file systems, networks, sub-networks, or the like.

Accordingly, in some embodiments, if a user or service attempts to access a resource (a service, computer, database, file system, application, or the like) in a protected network, a computer or application, such as, infrastructure security computer 406 may be interrogated to determine if the configuration profile associated with resource may be satisfied before enabling the access activity.

In some embodiments, infrastructure security computers may be arranged to centrally store network policy information, configuration profiles, network configuration information, or the like. Also, in some embodiments, some or all network policy information may be stored locally on the protected resources. Or, also, in some embodiments, the network policy information may be stored by one or more intermediary services/computers (not shown) separate from the infrastructure security computer or the protected entities.

In some embodiments, infrastructure security computers, such as, infrastructure security computer 406 may be arranged to employ a policy engine, such as, policy engine 408 to declare network policies, configuration profiles, or the like. In some embodiments, policy engines may be incorporated directly in an infrastructure security computer. Also, in some embodiments, policy engines may be separate processes hosted on the same or different computer as an infrastructure security computer.

Accordingly, in some embodiments, policy engines, or the like, may be arranged to provide user interfaces that enable users (e.g., administrators) to generate configuration profiles for protected resources, users, or the like, in the protected network, or other manage policies for protecting networked infrastructure.

In some embodiments, policy engines may be arranged to accept natural language expressions of policy goals, policy constraints, or the like, hereinafter referred to as policy statements. In some embodiments, policy engines may be arranged to incorporate the policy statement into a prompt that may be compatible with one or more large language models. Accordingly, in some embodiments, policy engines may be arranged to provide the prompt to a large language model, such as, large language model 410 which may provide a configuration profile in response. Thus, in some embodiments, policy engines may be arranged to generate a configuration profile that satisfies the policy statement based on the large language model's response to the prompt.

In some embodiments, different prompt templates may be provided to support particular large language models or particular types of policy statements. For example, in some embodiments, a first prompt template may include context information that directs large language models to produce a particular type of result while a second prompt template may be include context information that directs large language models to produce a different type of result.

Accordingly, in some embodiments, a data store, such as, large language model Information data store 412 may be employed to store prompt templates. Also, in some embodiments, data store 412, or the like, may be employed to store a previously used policy statements, previously generated configuration profiles, performance metrics, or the like. In some embodiments, data store 412 may be arranged to include one or more indexes, databases, or the like, that enable incoming prompts or large language model results to be compared to previous prompts or results.

Figure 5:
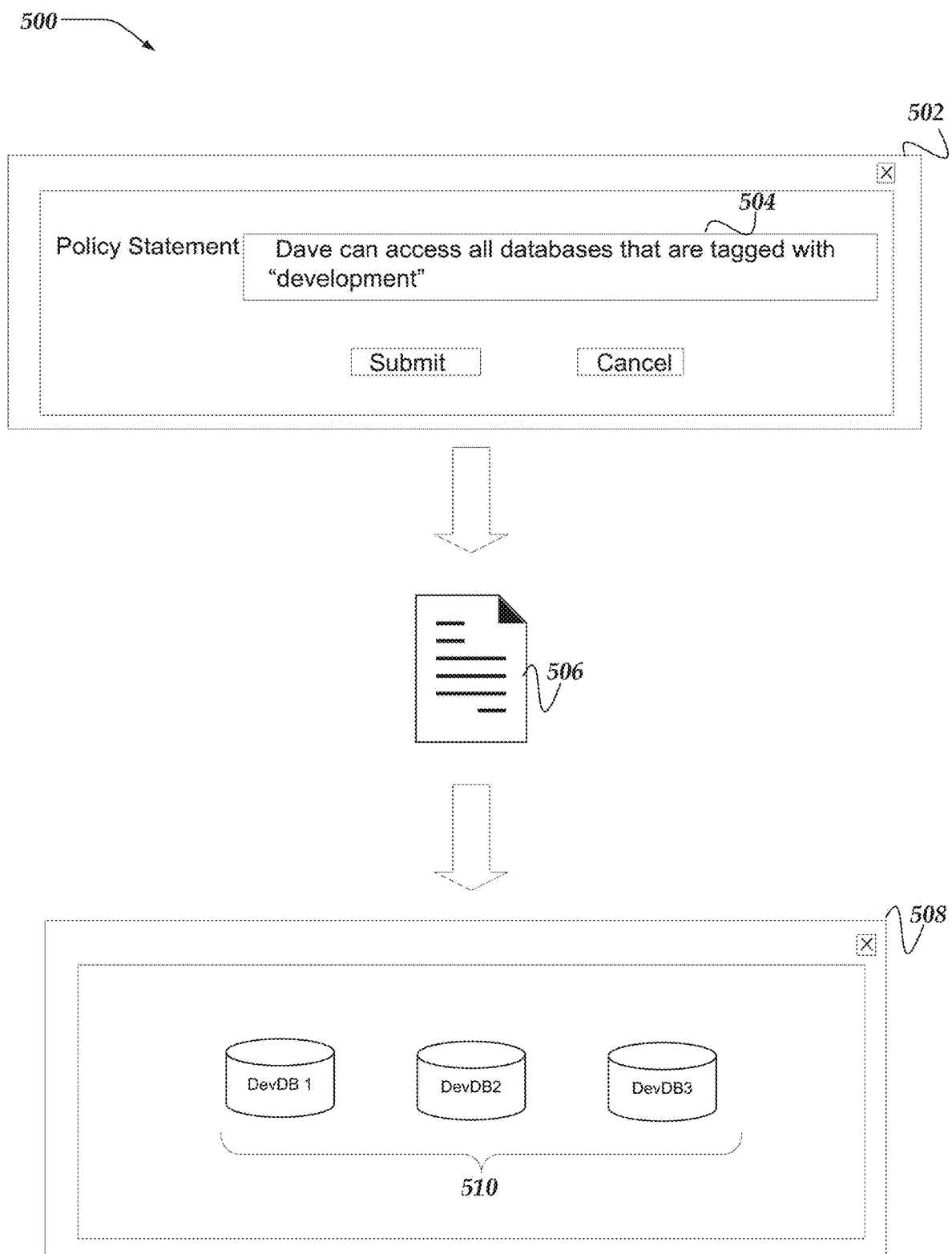
FIG. 5 illustrates a logical schematic of a system for declaring network policies using natural language in accordance with one or more of the various embodiments.

FIG. 5 illustrates a logical schematic of system 500 for declaring network policies using natural language in accordance with one or more of the various embodiments. As described above, in some embodiments, policy engines or infrastructure security computers may be arranged to provide user interfaces that enable users to provide statements in text, audio, or the like, that may be used to generate policy statements.

In some embodiments, policy statements may include natural language expressions that define or declare one or more policy goals, one or more tasks, or one or more intentions. In this example, user interface 502 enables a user to provide policy statements, such as, policy statement 504.

Accordingly, in some embodiments, if policy statements may be included in a prompt template to generate prompt dataset to provide to a large language model, the large language model may be trained to generate one or more configuration profiles based on the prompt dataset.

Also, in one or more of the various embodiments, policy engines or infrastructure security computers may be arranged to generate user interfaces that include one or more reports (e.g., visualizations) that may illustrate which network policies, computers, resources, users, applications, or the like, that may be affected by the configuration profile. Accordingly, in some embodiments, policy engines may be arranged to enable users to validate or invalidate configuration profiles based on the correctness of the management of network resources that may correspond to the configuration profile. For example, for policy statement 504 and configuration profile 506, an interactive report that includes a visualization, such as, visualization 508 may be provided to show which databases (if any) the configuration profile enables Dave to access.

Note, in some embodiments, the particular data structure, format, field names, or the like, for the configuration profiles are omitted here because configuration profiles may be arranged to conform to the particular requirements of the infrastructure security computer. In some embodiments, different infrastructure security computers may require different configuration profile formats. Thus, in some embodiments, policy engines may be arranged to provide different configuration profile formats depending on local requirements or local circumstances. As mentioned above, in some embodiments, different prompt templates may be configured to produce configuration profiles with different formats. Likewise, in some embodiments, different prompt templates may be provided for different types of large language models.

In one or more of the various embodiments, policy engines may be arranged to generate prompt datasets (described below in more detail) based on prompt templates and policy statements. Accordingly, in some embodiments, policy engines may be arranged to provide prompt datasets to large language models to train the large language model to generate configuration profiles. In some embodiments, large language models may be trained in-place by consuming prompt datasets that include context information, guide rules, examples, or the like. Thus, in some embodiments, large language models may be trained on-the-fly to generate configuration profiles based on the provided prompt datasets. Note, this type of on-the-fly may be considered different that the initial durable training requirement to create a large language model. Accordingly, the training associated with consuming prompt datasets may be considered dynamic or transient training that enables the large language model to generate configuration profiles from policy statements such the configuration profiles conform to the requirements of an infrastructure security computer.

In this example, for some embodiments, user interface 502 may be considered to represent a user interface that enables a user to provide a natural language text statement for generating policy statements, such as, policy statement 504. Accordingly, in some embodiments, policy engines may be arranged to enable the user to submit the policy statement to a policy engine. In some embodiments, policy engines may be arranged to include the policy statement in a large language model prompt dataset that may be provided to a large language model. Thus, in some embodiments, candidate configuration profiles, such as, candidate configuration profile 506 may be generated by the large language model and provided the policy engine.

Accordingly, in some embodiments, infrastructure security computers or policy engines may be arranged to generate a user interface, such as, user interface 508 to display the results to the user as a report, interactive report, visualization, or the like. In this example, user interface 508 may be considered as displaying a visualization showing which database resources policy statement 504 enables "Dave" to access.

Note, in some embodiments, different visualizations, reports, interactive or otherwise may be generated depending on the type of resources, the type or configuration profile, or the like, depending on the local requirements or local circumstances. In some cases, infrastructure security computers or policy engines may be arranged to employ configuration information to associate particular user interfaces or visualizations with particular configuration profiles or affected resources. Accordingly, in some embodiments, administrators or users may be enabled to configure or otherwise select from among different visualization styles or schemes depending on local preferences.

Further, in some embodiments, policy engines may be arranged to provide one or more user interfaces that enable users to directly manipulate or edit a prompt template or prompt dataset. Accordingly, in some embodiments, advanced users may be enabled to edit prompt templates or prompt datasets directly rather than being limited to modifying policy statements. For example, in some embodiments, if an advanced user is not satisfied with the configuration profiles being generated based on a prompt template, the advanced user may be enabled to edit the prompt template or associated prompt datasets directly before the policy engine submits them to a large language model.

Figure 6:
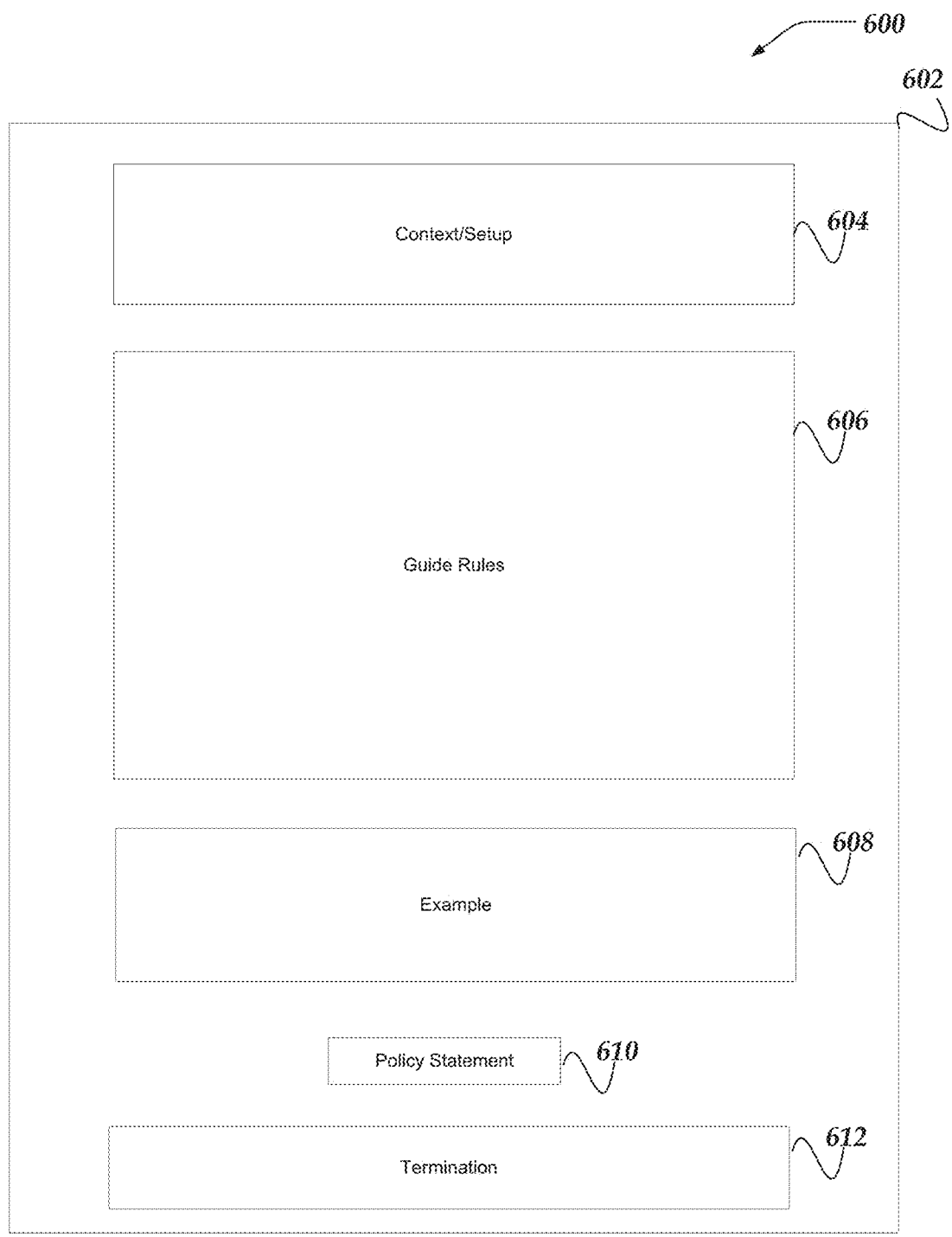
FIG. 6 illustrates a logical schematic of a prompt dataset for declaring network policies using natural language in accordance with one or more of the various embodiments.

FIG. 6 illustrates a logical schematic of prompt dataset 600 for declaring network policies using natural language in accordance with one or more of the various embodiments. As described above, in some embodiments, policy engines may be arranged to determine a prompt template from among one or more prompt templates. In some embodiments, if a prompt template may be determined and a policy statement is provided, policy engines may be arranged to generate a prompt dataset based on the prompt template and the policy statement.

One of ordinary skill in the art will appreciate that the particular contents or text included in prompt templates may vary depending on various factors, including, the large language model (e.g., different types/version/brands may require different prompt templates), format or content required for configuration profiles, or the like. In general prompt templates may be developed experimentally such that prompt templates that produce prompt dataset that may train large language models to produce configuration profiles that conform to the requirements of the infrastructure security computer. In some embodiments, prompt templates may be included in a prompt template repository or other large language model data store. In some cases, employing prompt datasets to train a more generalized language model to provide particular result that the language model may not explicitly be trained or tuned for may be referred to as zero-shot learning because the generalized language model (referred to herein as large language models) is trained by the prompt dataset. Accordingly, in some embodiments, large language model that consume prompt datasets may perform transfer learning, or the like, to provide specific results, such as, configuration profiles.

Accordingly, in some embodiments, the particular contents of prompt templates or prompt datasets may depend on semantic understanding capabilities of the underlying large language model. Thus, in some cases, different large language models may require different prompt templates. Further, in some embodiments, different large language model may be engineered with different target audiences, problem domains, or the like. Accordingly, in some embodiments, policy engines may be arranged to select among multiple large language models depending the policy statements, network resources, type of configuration profile, or the like.

In some embodiments, prompt templates may comprise a dataset container, such as, container 602 that may hold the contents (e.g., text or audio) for the prompt. Also, in some embodiments, prompt templates may be configured to include various sections, including, for example, context section 604, guide rule section 606, example section 608, policy statement placeholder 610, termination section 612, or the like. In some cases, for some embodiments, prompt templates may omit one or more sections. Likewise, in some embodiments, prompt templates may include one or more other sections. Further, in some cases, prompt templates may arrange the various sections in a different order than shown here. Thus, in some embodiments, policy engines may be arranged to employ different prompt templates for different problems or different large language models as needed.

In one or more of the various embodiments, dataset containers may be variables, parameters, objects, data structures, or the like, that enable the prompt datasets to be passed to a large language model. In some cases, for some embodiments, a dataset container may be a buffer of text characters that form a string collection that may be included in the prompt dataset. Likewise, for example, a dataset container may be an object or class instance designed for handling the types of content (e.g., string, audio, or the like) included in a particular prompt dataset.

In one or more of the various embodiments, context sections such as context section 604 may be portions of a prompt template that inject statements that establish a working context that may aid in the training of the large language model to generate configuration profiles. For example, in some embodiments, context sections may be employed to declare one or more features or characteristics of a configuration profile. Accordingly, in some embodiments, large language models may incorporate this context information as part of the generative process that is trained to produce the configuration profiles.

In one or more of the various embodiments, guide rule sections such as guide rule section 606 may be portions of a prompt template that inject one or more statements that may be selected to provide additional guidance or direction for training the large language model to generate configuration profiles. For example, in some embodiments, guide rules may include statements that declare rules for omitting certain types of punctuation, omitting in-depth explanation text from configuration profiles, directives to specifically or particularly take actions if certain words or text forms are encountered while generating configuration profiles, or the like.

In one or more of the various embodiments, example sections such as example section 608 may be portion of a prompt template that include one or more example policy statements and one or more example configuration profiles that may correspond to the example policy statement. In some embodiments, if needed, the example information may guide the training of the large language model to generate a configuration profile the conforms the requirements of the infrastructure security computers or policy engines.

In one or more of the various embodiments, policy statement placeholders such as policy statement placeholder 610 may be specialized tokens, markers, mark-up, or the like, that indicate where in prompt template the actual policy statement should be embedded in the prompt.

In one or more of the various embodiments, termination sections such as termination section 612 may be portion of a prompt template that includes additional context information or guide rules that may be required to "close" the prompt dataset. For example, for some embodiments, termination sections may include a text statement indicating the large language model should end the text generation session, or the like.

FIG. 7 illustrates prompt template 700 for declaring network policies using natural language in accordance with one or more of the various embodiments. As described above, prompt templates may include one or more sections. Accordingly, for some embodiments, prompt template 700 represents a prompt template that a policy engine may employ to generate a prompt dataset that may be provided to train a large language model to generate configuration profiles.

In this example, for some embodiments, context section 704 includes text that describes features of the a profile object, including field names, field types, and so on.

Also, in this example, guide rule section 706 includes text statements selected to guide the training of the large language model to generate the configuration profile.

Also, in this example, example section 708 includes an example of a policy statement that a user may be expected to provide and a configuration profile that would correspond to the example policy statement. Accordingly, in some embodiments, the large language model may be trained to generate configuration profile that conform to the examples.

Also, in this example, policy statement placeholder 710 indicates the location in the prompt template where the policy statement should be placed.

Also, in this example, termination section 712 includes a closing text statement that trains the large language model to terminate the generation of configuration profile. For example, in some cases, absent a termination section, some large language models may generate additional text, such as, closing explanations, sign-off (end-of-session) statements, or the like.

Figure 8:
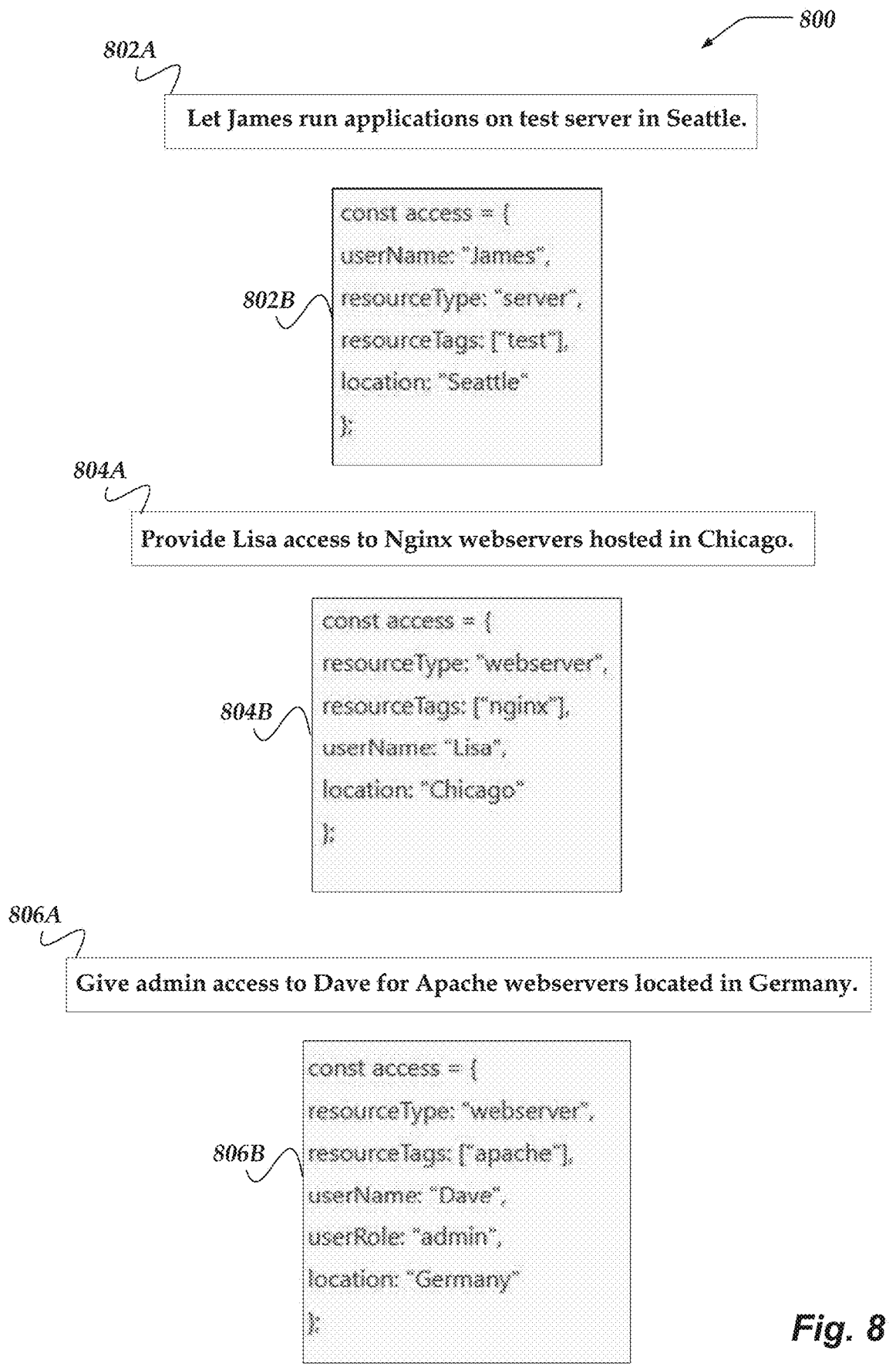
FIG. 8 illustrates a collection of policy statements and configuration profiles for declaring network policies using natural language in accordance with one or more of the various embodiments.

FIG. 8 illustrates a collection of policy statements and configuration profiles for declaring network policies using natural language in accordance with one or more of the various embodiments. In this example, collection 800 shows example policy statements and their corresponding configuration profiles generated by an large language model.

In this example, for some embodiments, policy statement 802A may be injected or otherwise incorporated into a large language model prompt template such as prompt template 700. Accordingly, in some embodiments, a policy engine may submit the resulting prompt dataset to a large language model to train it to generate a configuration profile, such as, configuration profile 802B. Likewise, for some embodiments policy statement 804A may train the large language model to generate configuration profile 804B and policy statement 806A may train large language models to generate configuration profile 806B.

Note, one of ordinary skill in the art will appreciate that the fields, field names, contents, format, structure, or the like, of configuration profile 802A, configuration profile 804A, configuration profile 806A may vary to conform to local requirements or local circumstances associated with the management of network resources of a particular infrastructure security computer or policy engine. For example, in some cases, an infrastructure security system may support or require configuration profiles of various formats or structures depending on the features of the infrastructure security system being configured. Likewise, in some embodiments, policy engines, prompt templates, configuration profile formats, or the like, may be adapted to particular large language models based on local requirements or local circumstances.

Generalized Operations

FIGS. 9-14 represent generalized operations for declaring network policies using natural language in accordance with one or more of the various embodiments. In one or more of the various embodiments, processes 900, 1000, 1100, 1200, 1300, and 1400 described in conjunction with FIGS. 9-14 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 9-14 may be used for declaring network policies using natural language in networked environments accordance with at least one of the various embodiments or architectures such as those described in conjunction with FIGS. 1-8 Further, in one or more of the various embodiments, some or all of the actions performed by processes 900, 1000, 1100, 1200, 1300, and 1400 may be executed in part by infrastructure security engine 322, policy engine 326, one or more mesh agents, such as, mesh agent 324, or the like, running on one or more processors of one or more network computers.

Figure 9:
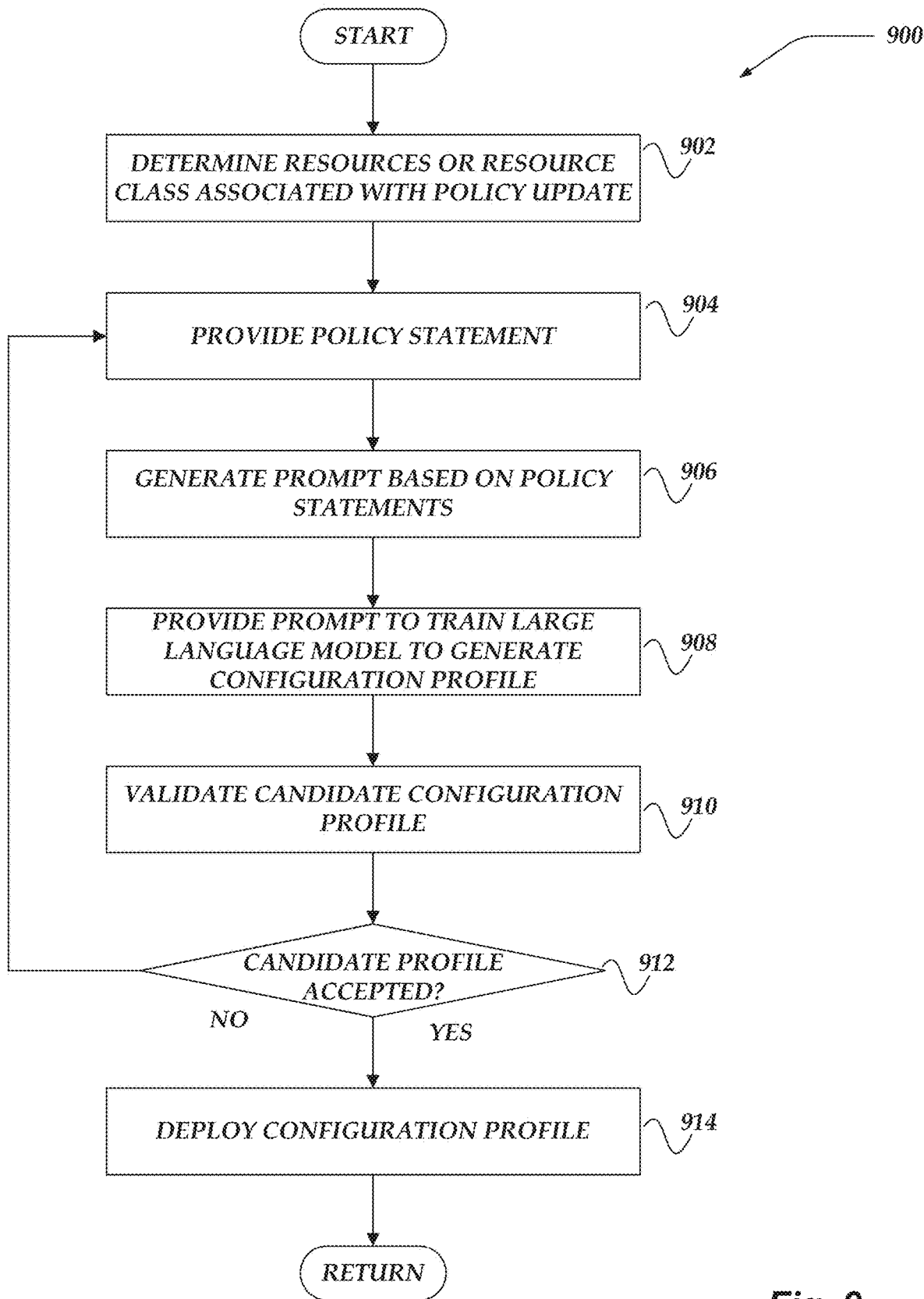
FIG. 9 illustrates an overview flowchart of a process for declaring network policies using natural language in accordance with one or more of the various embodiments.

FIG. 9 illustrates an overview flowchart of process 900 for declaring network policies using natural language in accordance with one or more of the various embodiments. After a start block, at block 902, in one or more of the various embodiments, one or more resources or one or more resource classes associated with the instant policy update may be determined. At block 904, in one or more of the various embodiments, a policy statement may be provided. At block 906, in one or more of the various embodiments, policy engines may be arranged to generate one or more large language model prompt datasets based on the policy statement and a prompt template. At block 908, in one or more of the various embodiments, policy engines may be arranged to provide the one or more prompt datasets to train one or more large language models to generate one or more configuration profiles. At block 910, in one or more of the various embodiments, policy engines may be arranged to validate the one or more configuration profiles. At decision block 912, in one or more of the various embodiments, if the candidate configuration profile may be validated, control may flow to block 912; otherwise, control may loop back to block 904. As described above, in some embodiments, policy engines may be arranged to interactively cycle through providing policy statements, generating prompt datasets, training large language models, until a candidate configuration profile may be validated. In some embodiments, validation may be determined based on one or more automatic conditions being met For example, in some embodiments, the candidate configuration profile may be validated based on it meeting one or more conditions defined or declared in configuration information. Also, for example, in some embodiments, policy engines may be arranged to provide a user interface that enables users to validate candidate configuration profiles based on reviewing a report describing the predicted effect of the candidate configuration profile on network policies or the management of network resources.

At block 912, in one or more of the various embodiments, policy engines or infrastructure security computers may be arranged to deploy the one or more configuration profiles into the secured networks. Next, in one or more of the various embodiments, control may be returned to a calling process.

Figure 10:
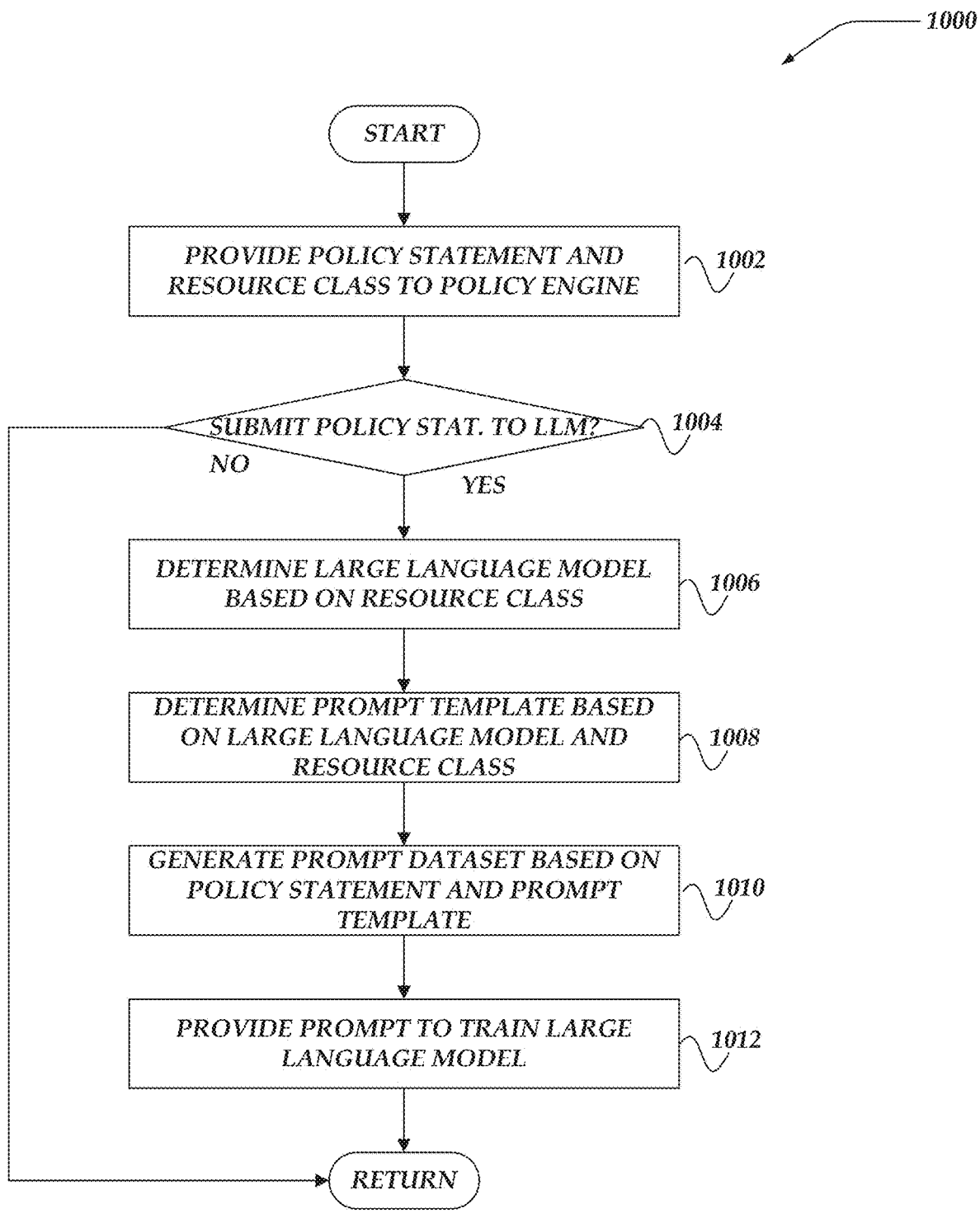
FIG. 10 illustrates a flowchart of a process for declaring network policies using natural language in accordance with one or more of the various embodiments.

FIG. 10 illustrates a flowchart of process 1000 for declaring network policies using natural language in accordance with one or more of the various embodiments. After a start block, at block 1002, in one or more of the various embodiments, a policy statement may be provided to a policy engine. In some embodiments, additional resource information associated with one or more resources in the network may be provided. As described above, in some embodiments, policy engines may be arranged to generate one or more user interfaces that enable policy statements to be generated based on one or more statements that may be entered, selected, or otherwise, provided by a user. In some embodiments, statements may be comprised natural language text, real-time audio speech, recorded audio speech, speech-to-text text, or the like.

At decision block 1004, in one or more of the various embodiments, if the policy engines determines that the policy statement may be provided to a large language model, control may flow to block 1006; otherwise, control may be returned to a calling process. In some embodiments, policy engines may be arranged to perform an initial screening or filtering of the statements used to generate policy statements before accepting them. In some embodiments, policy engines may be arranged to employ parsers, NLP, Machine-Learning models (including large language models) to perform an initial evaluation to determine if a policy statement may be accepted. For example, in some embodiments, policy engines may be configured to test the policy statement against a collection of reserved words, restricted words, reserved characters, or the like, that should be excluded from policy statements. In some embodiments, policy engines may be arranged to enable organizations to apply various conditions, heuristics, or the like, to provided policy statements. Accordingly, in some embodiments, policy engines may be arranged to employ one or more rules, instructions, grammars, machine-learning models, or the like, provided via configuration information to determine if a policy statement may be used. Thus, in some embodiments, policy engines may be enabled to account for local requirement or local circumstances.

At block 1006, in one or more of the various embodiments, policy engines may be arranged to determine one or more large language models based on the resource class. In some embodiments, more than one large language model may be available. Accordingly, in some embodiments, policy engines may be arranged to associate one or more particular large language models with particular resource classes, geographic regions, users, networks, or the like. For example, in some embodiments, some jurisdictions may exclude one or more large language models for various reasons (e.g., legal considerations, political considerations, cost considerations, or the like). Also, in some cases, one or more organizations may have prior relationships with one or more particular large language models such that they prefer employing those large language models over others. Also, in some embodiments, some resource classes, users, networks, or the like, may be sensitive such that an organization may restrict where policy statements may be submitted. Accordingly, in some embodiments, policy engines may be arranged to enable organizations to establish rules for routing policy declarations to particular large language models. Thus, in some embodiments, policy engines may be arranged to employ rules, instructions, or the like, for directing policy declarations to particular large language models based on configuration information to account for local requirements or local circumstances.

At block 1008, In some embodiments, policy engines may be arranged to determine one or more prompt templates based on the one or more large language models or the resource class.

As mentioned above, in some embodiments, one or more prompt templates may be available for particular large language models. In some cases, for some embodiments, policy engines may be arranged to employ different prompt templates for some different types of resources, users, locations, different large language models, or the like. Also, in some cases, for some embodiments, a single prompt template may be used for policy declarations rather than using more than one prompt templates.

Accordingly, in some embodiments, policy engines may be arranged to apply one or more rules, instructions, or the like, to select a prompt template if there may be more than one available.

At block 1010, in one or more of the various embodiments, policy engines may be arranged to generate one or more prompt dataset based on the policy statement and the one or more prompt templates. In some embodiments, policy engines may be arranged to inject a policy statement into a prompt template to generate a prompt dataset. In some embodiments, the particular actions required for generating a prompt dataset from a prompt template and a policy statement may vary depending on the large language model such that generated prompts may conform to one or more requirements of the target large language model. For example, in some embodiments, if the large language model consumes text-based prompt datasets, that prompt template may include markup tags, or the like, that indicate where the text for a policy statement may be injected or embedded to generate the prompt template. Also, for example, if the large language model supports structured prompts (e.g., XML) there may be particular tags or fields where the policy statement may be embedded to conform the requirements of the large language model.

At block 1012, in one or more of the various embodiments, policy engines may be arranged to provide the one or more prompts to train the one or more large language models. In one or more of the various embodiments, policy engines may be arranged to employ one or more APIs that may accept the prompt dataset and provide it to the large language model. In some embodiments, policy engines may be arranged to support more than one type of API. Accordingly, in some embodiments, policy engines may be arranged to select a particular method for providing prompt datasets to a large language model based on various circumstances. For example, if the large language model is remotely hosted (e.g., cloud-based service), the API may communicate the prompt datasets to the large language model over the internet or other wide-area network. Similarly, in some embodiments, if the large language model may be hosted locally, policy engines may be arranged to execute the API as a local function call or system call, or the like, to provide the prompt dataset to the large language model. Further, in some cases, the large language model itself may be abstracted by one or more service layers that provide other features, such as, specialization, filtering, interaction methods, or the like. For example, in some cases, ChatGPT may be considered a wrapper around a GPT. Accordingly, in some cases, policy engines may be configured to route prompt datasets through one or more wrapper/abstraction services as a mechanism for providing the prompt datasets to large language model.

Also, in some embodiments, policy engines may be arranged to provide prompt datasets to an intermediate service or process that provides features, such as, queuing, routing, or the like, that may be associated with providing prompt datasets to large language models.

In one or more of the various embodiments, prompt datasets may be arranged to train the large language model during the execution of the API call. Accordingly, in some embodiments, each time prompt dataset may be provided to the large language model, the large language model may be temporarily retrained such that it may generate configuration profiles that conform to the requirements of the ISC.

Next, in one or more of the various embodiments, control may be returned to a calling process.

Figure 11:
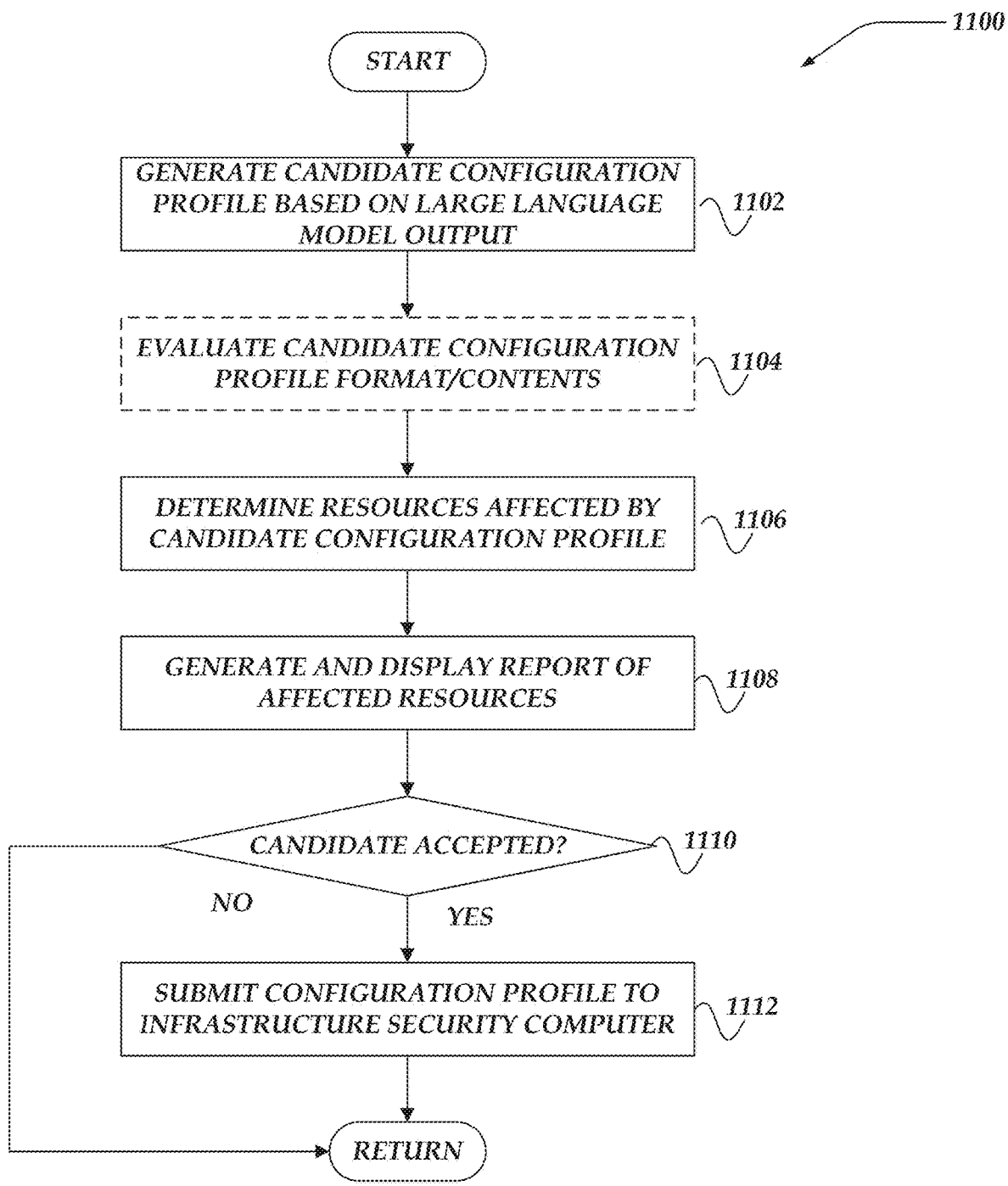
FIG. 11 illustrates a flowchart of a process for declaring network policies using natural language in accordance with one or more of the various embodiments.

FIG. 11 illustrates a flowchart of process 1100 for declaring network policies using natural language in accordance with one or more of the various embodiments. After a start block, at block 1102, in one or more of the various embodiments, policy engines may be arranged to generate one or more candidate configuration profiles based on responses from the one or more large language models. As described above, in some embodiments, policy engines may be arranged to generate configuration profiles based on policy statements, prompt templates, and large language models.

At block 1104, in one or more of the various embodiments, optionally, policy engines may be arranged to evaluate the one or more candidate configuration profiles in view of their format, structure, contents, or the like. In one or more of the various embodiments, policy engines may be arranged to automatically perform one or more actions to confirm that the format, structure, or contents of the configuration profiles conform to the requirements of the infrastructure security computer. For example, in some embodiments, policy engines may be arranged to execute one or more parsers, rules, or the like, to confirm that the configuration profiles may include fields, field types, field names, values, or the like, that may conform to the requirements of the infrastructure security computer. Also, in some embodiments, an organization may define or declare particular users, resources, fields, field names, or the like, to exclude or restrict from configuration profiles or parts of configuration profiles. For example, in one or more of the various embodiments, an organization may declare one or more reserved names that may not be included in configuration profiles. Thus, for example, if the prompt template and large language model produce a configuration profile with reserved content or restricted content, policy engines may reject those configuration profiles or raise one or more notifications.

Note, in some embodiments, organizations may have different requirements, different reserved names, or the like. Accordingly, in some embodiments, policy engines may be arranged to employ parsers, rules, filters, word lists, or the like, provided via configuration information to evaluate configuration profiles.

Note, this block is indicated as being optional because in some cases policy engines may rely on other systems or user to confirm the validity of configuration profiles or configuration profile formatting.

At block 1106, in one or more of the various embodiments, policy engines may be arranged to determine the zero or more resources that may be affected by the candidate configuration profiles. In one or more of the various embodiments, policy engines may be arranged to apply the candidate configuration profiles to the resources in the monitored networks to determine the set of resources that may be impacted by the candidate configuration profiles. In some embodiments, policy engines may be arranged to provisionally submit configuration profiles to an infrastructure security computer to determine affected resources. Also, in some embodiments, policy engines may be arranged to provide candidate configuration profiles to infrastructure security computers such that the infrastructure security computers may be arranged to provisionally execute the configuration profiles rather than providing a list or set of affected resources to the policy engines.

At block 1108, in one or more of the various embodiments, policy engines may be arranged to generate or display a report that includes the affected resources. In some embodiments, policy engines or infrastructure security computers may be arranged to generate or display an interactive visualization or other type of report that enables users to observe how the application of the candidate configuration profiles may impact protected networks or resources. Also, in some embodiments, policy engines or infrastructure security computers may be configured to employ one or more internal or external services to generate the interactive reports. Also, in some embodiments, policy engines or infrastructure security computers may be arranged to generate non-interactive reports such as, log entries, static documents, or the like, rather than being limited to providing interactive reports.

At decision block 1110, in one or more of the various embodiments, if one or more configuration profiles may be confirmed to be correct, control may flow to block 1112; otherwise control may be returned to a calling process. In some embodiments, policy engines or infrastructure security computers may be arranged to provide one or more user interfaces that enable users to indicate if a candidate configuration profile is acceptable.

At block 1112, in one or more of the various embodiments, policy engines may be arranged to provide the accepted configuration profiles to the infrastructure security computer for deployment in the protected networks.

Next, in one or more of the various embodiments, control may be returned to a calling process.

Figure 12:
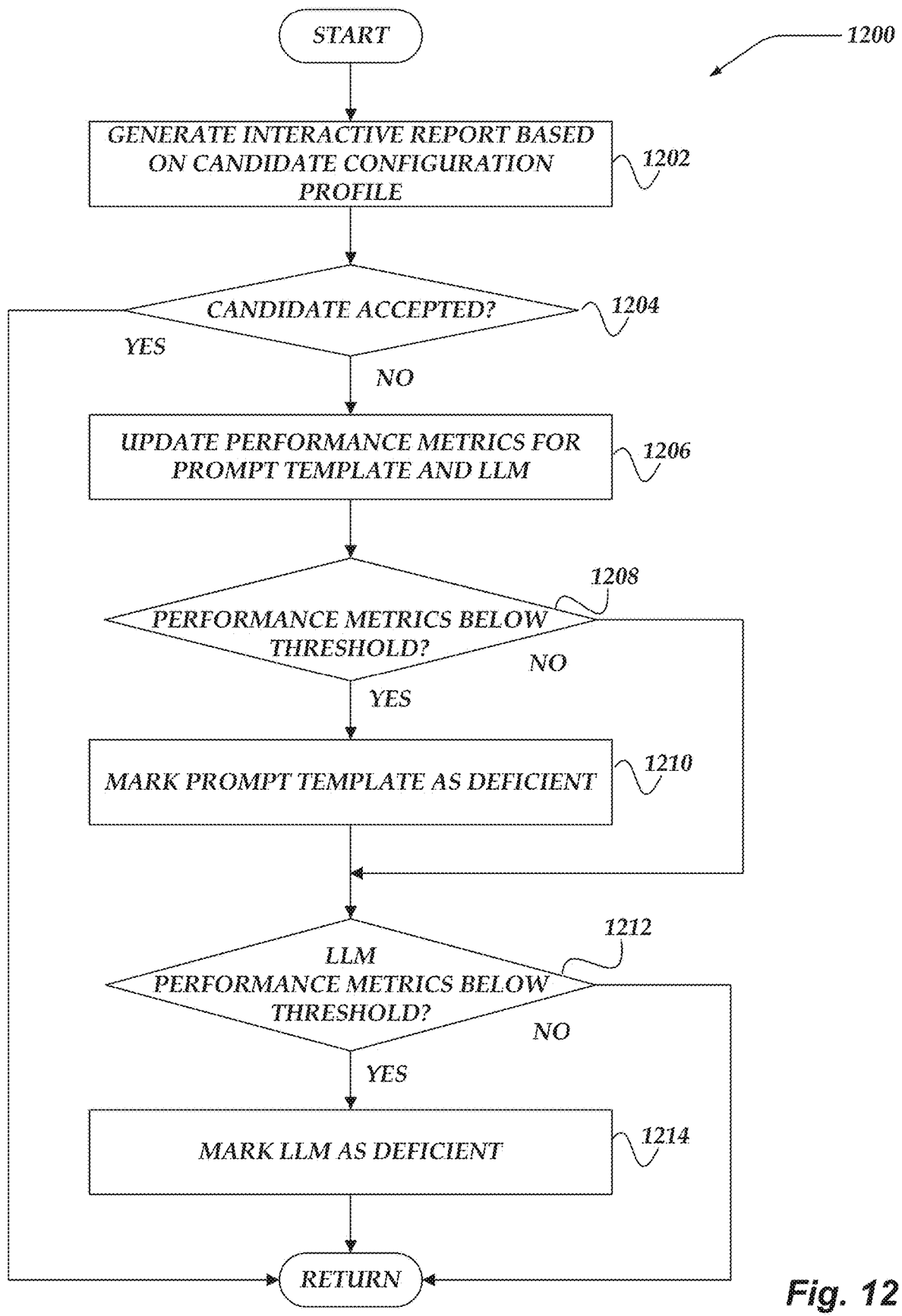
FIG. 12 illustrates a flowchart of a process for declaring network policies using natural language in accordance with one or more of the various embodiments.

FIG. 12 illustrates a flowchart of process 1200 for declaring network policies using natural language in accordance with one or more of the various embodiments. After a start block, at block 1202, in one or more of the various embodiments, policy engines may be arranged to generate an interactive report based on a candidate configuration profile. As described above, in some embodiments, configuration profiles generated by large language models may be considered candidate configuration profiles until they are confirmed or accepted by another user or automated system. In some cases, if users may be available, an interactive report that displays a report or visualization of the effect of the candidate configuration profiles may be generated and displayed to users.

For example, in some embodiments, policy engines may be arranged to provide user interface that enables users to enter a policy statement and thereafter view a visualization of the resources that may be impacted.

At decision block 1204, in one or more of the various embodiments, if the candidate configuration profile is accepted, control may be returned to a calling process; otherwise, control flow to block 1206. In some embodiments, policy engines may enable users to interactively try different policy statements until the candidate configuration profile report indicates a satisfactory configuration profile has been generated. In some embodiments, accepted configuration profiles may be provided to the infrastructure security computer for deployment.

At block 1206, in one or more of the various embodiments, policy engines may be arranged to update one or more performance metrics that may be associated with the instant prompt template or large language model. In one or more of the various embodiments, policy engines may be arranged to track or monitor the performance, user-satisfaction, or the like, for various prompt templates, large language models, or the like. Accordingly, in some embodiments, prompt templates or large language model may be evaluated to determine if they may be providing useful quality configuration profiles.

In one or more of the various embodiments, the particular metrics that may be tracked may be determined based on configuration information. For example, in some embodiments, performance metrics may include tracking how many times a prompt template or large language model generates configuration profiles that are rejected. Accordingly, in some embodiments, policy engines may be arranged to employ rules, instructions, threshold values, or the like, provided via configuration information to determine the particular performance metrics of interest. For example, in some cases, policy engines may be configured to track the number of rejections per user as well as prompt templates, or the like. Thus, for example, in some embodiments, an organization may investigate why some users reject configuration profiles more than others.

At decision block 1208, in one or more of the various embodiments, if one or more performance metrics associated may be below standard, control may flow to decision block 1212; otherwise, control may flow to block 1210.

At block 1210, in one or more of the various embodiments, policy engines may be arranged to mark or otherwise indicate that the prompt template may be deficient. For example, in some embodiments, policy engines may be arranged to associate flags, tags, or other indicators with prompt templates that may be used to identify if those prompt templates may be associated with poor or otherwise sub-standard performance.

At decision block 1212, in one or more of the various embodiments, if the large language model performance metrics may be below standard, control may flow to block 1214; otherwise, control may be returned to a calling process.

In some cases, large language models may gradually evolve such that they may begin to provide different results for the same prompts. For example, if the large language model is hosted or provided by a third-party, changes to the large language model may occur such as, upgrades, re-training, or the like, that may result in previously satisfactory prompt templates now producing poor results. Likewise, in some cases, a particular large language model may for unknown reasons have difficulty with particular policy statements or policy statements that include particular phrases or formats. Thus, in some embodiments, tracking performance metrics per large language models may enable organizations to identify which large language models may be less effective. Thus, in some embodiments, those organizations may be enabled to update prompt templates, switch to different large language models, or the like.

At block 1214, in one or more of the various embodiments, policy engines may be arranged to mark or otherwise indicate that the large language model may be deficient. For example, in some embodiments, policy engines may be arranged to associate flags, tags, or other indicators with large language models that may be used to identify if large language models may be associated with poor or otherwise sub-standard performance.

Next, in one or more of the various embodiments, control may be returned to a calling process.

Figure 13:
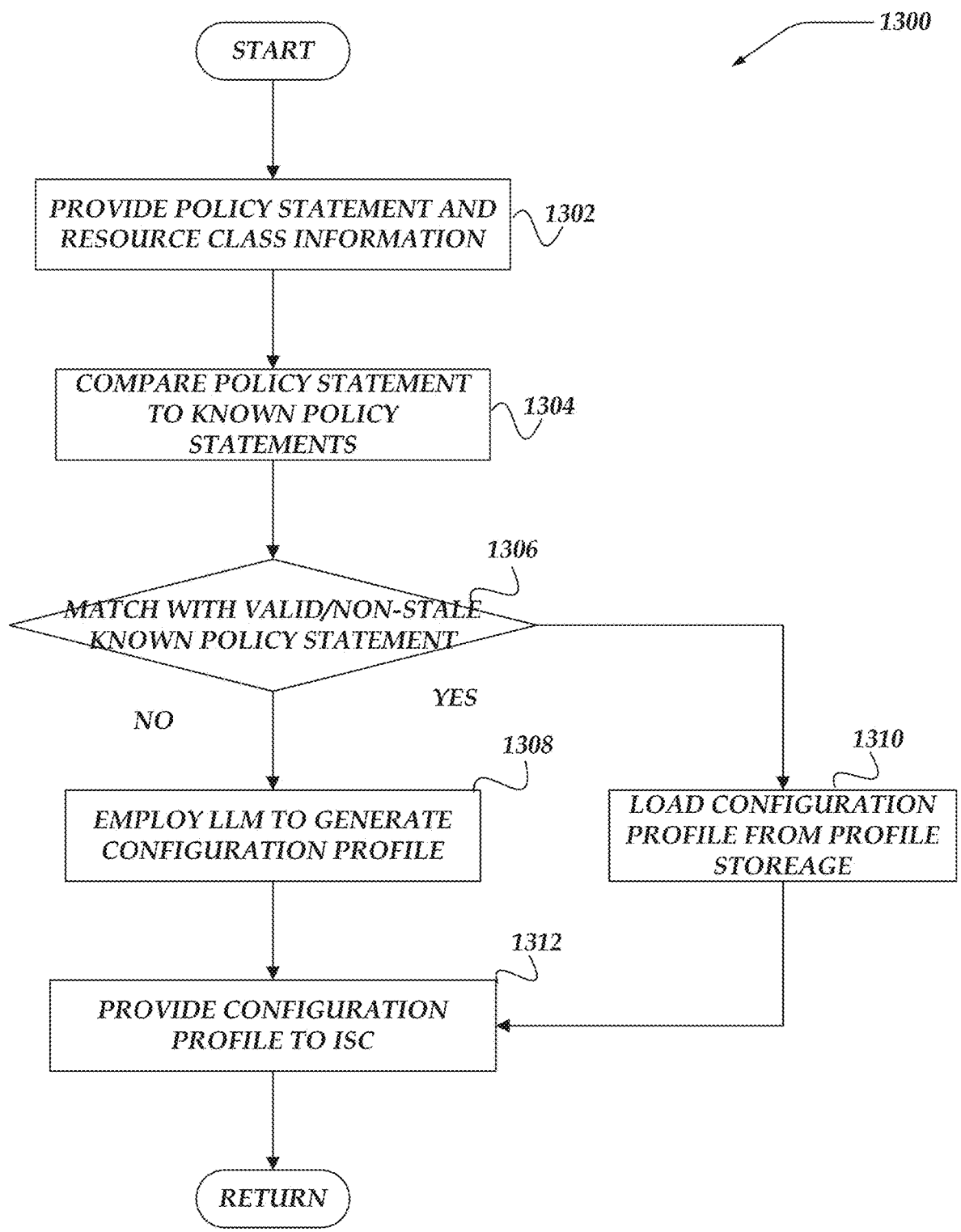
FIG. 13 illustrates a flowchart of a process for declaring network policies using natural language in accordance with one or more of the various embodiments.

FIG. 13 illustrates a flowchart of process 1300 for declaring network policies using natural language in accordance with one or more of the various embodiments. After a start block, at block 1302, in one or more of the various embodiments, policy engines may be provided a policy statement and resource class information. As described above, in some embodiments, policy engines or infrastructure security computers may be arranged to provide one or more user interfaces that enable users to provide a natural language policy statement. Also, in some embodiments, additional information, such as, information about the resources, resource classes, resource types, or the like. In some embodiments, resource classes may include devices, servers, applications, networks, sub-networks, or the like, may be included in a protected network or otherwise, managed by infrastructure security computers.

At block 1304, in one or more of the various embodiments, policy engines may be arranged to compare the policy statement to one or more known policy statements. In one or more of the various embodiments, policy engines may be arranged to evaluate if the provided policy statement may the same as a previously provided policy statement.

Accordingly, in some embodiments, if valid configuration profiles were generated using a matched policy statement, it may be possible to omit using a large language model to generate a corresponding configuration profile. In some embodiments, the use of a large language model API may be rate limited by per-transaction costs, compute expenses, or other resource contention. Accordingly, in some embodiments, a previously generated configuration profile that corresponds to a matching policy statement may be determined and applied. Thus, in some embodiments, the usage of large language model and associated costs may be reduced.

At decision block 1306, in one or more of the various embodiments, if there may be a match with one or more valid/non-stale known policy statements, control may flow to block 1310; otherwise, control may flow to block 1308. In one or more of the various embodiments, policy engines may be arranged to employ various matching criteria, matching rules, or the like, to determine if a provided policy statement matches a previously policy statement. For example, in some cases, local NLP, regular expressions, or the like, may enable policy statements that are similar except for user names, resource names, or the like, to be matched. Also, for example, in some embodiments, policy engines may be configured to require exact matches.

Further, in some embodiments, policy engines may be arranged to associate previously used policy statements with a timestamp that corresponds to its last known time of use. Accordingly, in some embodiments, policy engines may be arranged to exclude or restrict the use of previously used policy statements if the time elapsed since it most recent use exceeds a staleness duration threshold.

At block 1308, in one or more of the various embodiments, policy engines may be arranged to employ a large language model to generate a configuration profile based on the policy statement. As described above, in some embodiments, policy engines may be arranged to generate a prompt based on a prompt template and the policy statement which can be provided to a large language model to generate a configuration profile.

At block 1310, in one or more of the various embodiments, policy engines may be arranged to load a configuration profile from large language model information data store that may include configuration profiles. In some embodiments, a previously generated configuration profile may be provided from a data store or database. Accordingly, in some embodiments, an organization may avoid employing a large language model to generate the configuration profiles. In some cases, for some embodiments, this may reduce the costs or expenses associated with employing the large language models.

At block 1312, in one or more of the various embodiments, policy engines may be arranged to provide the configuration profile to an infrastructure security computer for deployment in the protected network. As described above, in some embodiments, configuration profiles may be provided to infrastructure security computers for incorporation into the overlay network management or security of one or more networks, network resources, or the like.

Next, in one or more of the various embodiments, control may be returned to a calling process.

Figure 14:
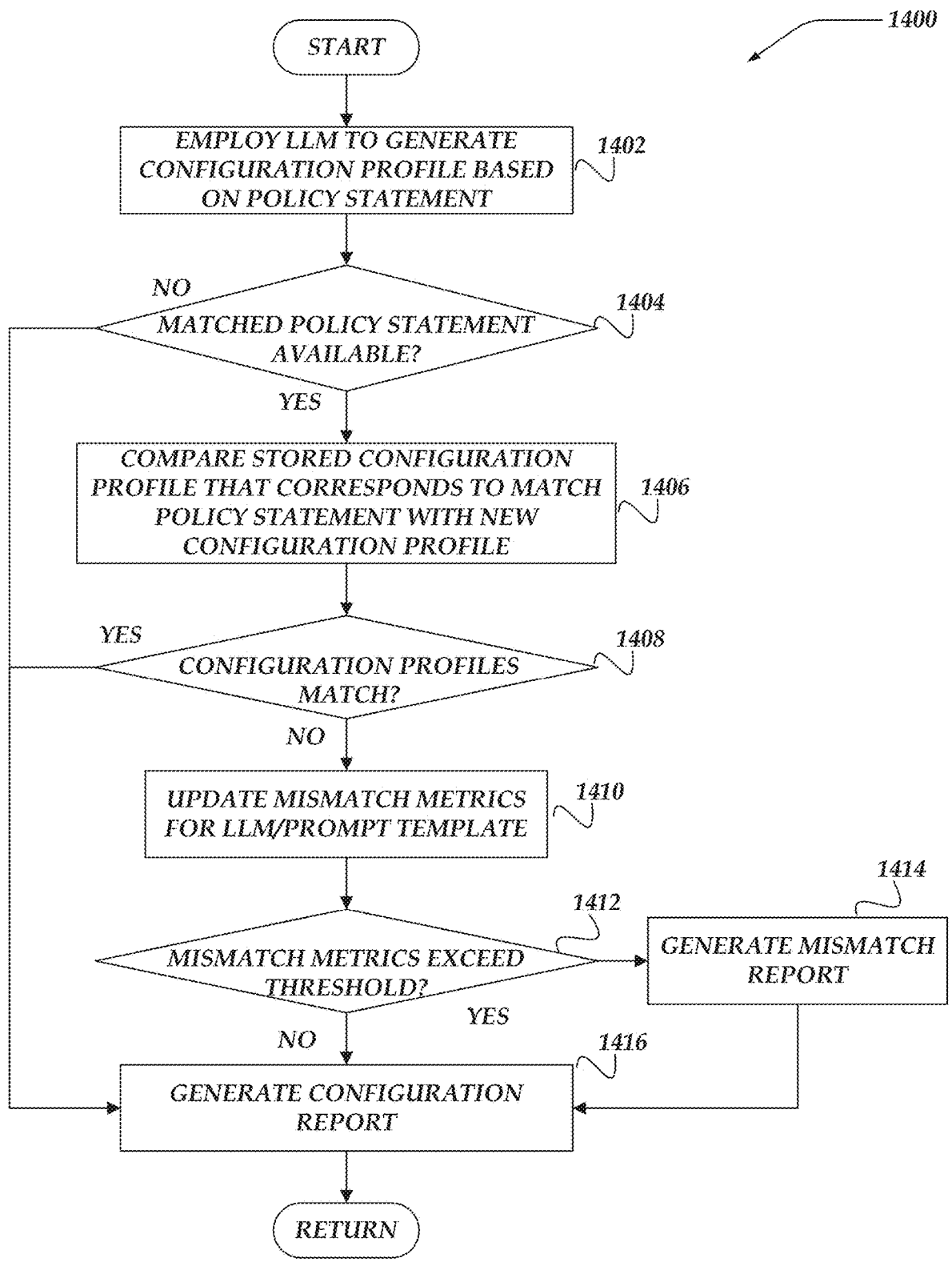
FIG. 14 illustrates a flowchart of a process for declaring network policies using natural language in accordance with one or more of the various embodiments.

FIG. 14 illustrates a flowchart of process 1400 for declaring network policies using natural language in accordance with one or more of the various embodiments. After a start block, at block 1402, in one or more of the various embodiments, a large language model may be employed to generate one or more configuration profiles based on one or more policy statements. As described above, in some embodiments, policy engines may be arranged to generate a prompt from a prompt template. Accordingly, in some embodiments, the prompt may be provided to a large language model to generate configuration profiles.

At decision block 1404, in one or more of the various embodiments, if one or more matched policy statements may be determined, control may flow to block 1406; otherwise, control may flow to block 1416. In some embodiments, policy engines or infrastructure security computers may be arranged to provide a data store or database that includes previously employed policy statements, resulting configuration profiles, or related information.

In one or more of the various embodiments, policy engines may be configured to check for matching policy statements such that all policy statements may be checked, a sample/portion of policy statements may be checked, or the like, depending on local requirements or local circumstances. Accordingly, in some embodiments, policy engines may be arranged to employ rules, conditions, parameters, instructions, or the like, provided via configuration information to determine if a particular policy statement or configuration profile may be checked.

At block 1406, in one or more of the various embodiments, policy engines may be arranged to compare one or more stored configuration profiles that may correspond to the one or more matched policy statements with the one or more newly generated configuration profiles.

In some embodiments, policy engines or infrastructure security computers may be arranged to provide a data store or database that includes previously employed policy statements, resulting configuration profiles, or related information. In some embodiments, related information may include a reference or identifier for recording which large language model, large language model version, prompt template, prompt template version, or the like, that may have been employed for previously generating configuration profiles.

Also, in some embodiments, one or more performance metrics may be kept for various prompt templates, large language models, or the like.

Accordingly, in some embodiments, policy engines may obtain previously generated configuration profiles that match the current policy statement from the data store. In some embodiments, the previously generated configuration profiles may be compared with the current/new configuration profiles to determine if there may be a mismatch.

In some embodiments, mismatched configuration profiles from the same or similar policy statement may indicate that for some reason, the large language model has provided different/unexpected results for the newly submitted prompt, even though the new policy statement matches the previous policy statements.

At decision block 1408, in one or more of the various embodiments, if the one or more newly generated configuration profiles match the one or more stored configuration profiles, control may flow to block 1416; otherwise, control may flow to block 1410. In one or more of the various embodiments, criteria for determining if new configuration profiles mismatch previously employed configuration profiles may vary depending on local requirements or local circumstances. Accordingly, in some embodiments, policy engines may be arranged to employ rules, conditions, parameters, instructions, or the like, provided via configuration information to determine if a particular configuration profile matches or mismatches previous configuration profiles. For example, in some embodiments, an organization may require exact matches while another organization may employ NLP to determine matches based on less restrictive requirements.

At block 1410, in one or more of the various embodiments, policy engines may be arranged to update one or more mismatch metrics associated with the one or more large language models or the one or more prompt templates. In one or more of the various embodiments, mismatch metrics may be considered to be performance metrics. In some embodiments, such metrics may be associated with prompt templates, large language models, resource classes, particular resources, user/role classes, particular users or roles, or the like. For example, in some embodiments, a particular large language model may be associated with a mismatch metric that may be incremented each time a configuration profile mismatch may be determined for configuration profiles the large language model generates. Accordingly, in some embodiments, policy engines may be arranged to employ rules, instructions, criteria, or the like, provided via configuration information to determine one or more mismatch metrics.

At decision block 1412, in one or more of the various embodiments, if the one or more mismatch metrics exceed one or more threshold values, control may flow to block 1414; otherwise, control may flow to block 1416. As described above, the particular metrics of interest may vary depending on local requirements or local circumstances. Similarly, in some embodiments, the determination of if the one or more mismatch metrics exceed a threshold value may vary depending on local requirements or local requirements. For example, in some embodiments, some organizations may allow ten percent of configuration profiles for large language model to be mismatched while other organizations may be have stricter requirements. Accordingly, in some embodiments, the particular conditions for determining if a mismatch metric threshold has been exceeded may be determined based on configuration information.

At block 1414, in one or more of the various embodiments, policy engines may be arranged to generate one or more mismatch reports that indicate the mismatched configuration profiles and may include additional information regarding which metrics, large language models, large language model versions, prompt templates, or the like, that may be associated with the mismatched configuration profiles.

Also, in one or more of the various embodiments, a mismatch report may be a log entry, notification, database entry, or the like, rather than being limited to a standalone document or interactive user interface. In some cases, for some embodiments, mismatch reports may be incorporated in other reports, user interfaces, or the like.

At block 1416, in one or more of the various embodiments, policy engines may be arranged to generate a configuration report that shows how the newly generated configuration profiles may impact the management of the infrastructure, network, resources, users, or the like, that may be associated with the new configuration profiles. In some embodiments, as mentioned, configuration reports may include interactive visualizations that may be displayed in user interface. Also, in some embodiments, mismatch report information, if any, may be included in configuration reports.

Next, in one or more of the various embodiments, control may be returned to a calling process It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing one or more network resources in a network using one or more processors to execute instructions that are configured to cause actions, comprising:
displaying a user interface that displays a statement, provided by a user, for management of the one or more network resources, wherein a policy statement for the management of the one or more network resources is generated based on the statement;
generating a prompt dataset for one or more large language models based on the policy statement and a prompt template, wherein the prompt template includes one or more of a field name, an exemplar field value, an exemplar policy statement, or an exemplar configuration profile; and
in response to providing the prompt dataset to train the one or more large language models, performing further actions, including:
generating a candidate configuration profile based on information provided by the one or more trained large language models, wherein the candidate configuration profile includes one or more field names and one or more field values associated with the management of the one or more network resources; and
in response to validation of the candidate configuration profile for the management of the one or more network resources, providing the validated candidate configuration profile to an infrastructure security computer (ISC), wherein the ISC updates one or more network policies based on the validated candidate configuration profile.

2. The method of claim 1, further comprising:
in response to invalidation of the candidate configuration profile for the management of the one or more network resources, the one or more trained large language models are retrained with one or more other candidate configuration profiles based on one or more other prompt datasets generated with one or more other policy statements associated with one or more other statements provided by the user; and
in response to validation of the one other candidate configuration profiles for the management of the one or more network resources, providing the validated other candidate configuration profile to the infrastructure security computer (ISC), wherein the ISC updates the one or more network policies based on the validated other candidate configuration profile.

3. The method of claim 1, wherein providing the statement further comprises:
providing one or more of a text statement or an audio statement from the user to the user interface;
determining one or more reserved words or reserved characters included in the statement based on one or more of a heuristic, a pattern match, natural language processing (NLP), or a machine learning model.

4. The method of claim 1, further comprising:
comparing the policy statement to one or more previously employed policy statements; and
in response to the policy statement matching the one or more previously employed policy statements, performing additional actions, including:
determining one or more previously employed configuration profiles that correspond to the one or more matched policy statements; and
providing the one or more previously employed configuration profiles to the ISC.

5. The method of claim 1, further comprising:
generating one or more metrics associated with the one or more large language models, wherein the one or more metrics are modified based on the validation of the candidate configuration profile or invalidation of the candidate configuration profile; and
in response to the one or more metrics having a value below a threshold value, generating one or more notifications associated with the one or more large language models that correspond to the one or more metrics that have a value below the threshold value.

6. The method of claim 1, further comprising:
generating one or more metrics associated with the prompt template, wherein the one or more metrics are modified based on the validation or invalidation of the candidate configuration profile; and
in response to the one or more metrics having a value below a threshold value, generating one or more notifications that indicate that the prompt template is deficient.

7. The method of claim 1, wherein determining the prompt template, further comprises:
determining one or more characteristics associated with the one or more network resources, wherein the one or more characteristic include one or more of a resource class, a user role, an application type, or a geographic region; and
determining the prompt template from a plurality of stored prompt templates based on the one or more characteristics.

8. The method of claim 1, further comprising:
comparing the policy statement to one or more previously employed policy statements; and
in response to the policy statement matching the one or more previously employed policy statements, performing additional actions, including:
determining one or more previously employed configuration profiles that correspond to the one or more matched policy statements;
comparing the candidate configuration profile to the one or more previously employed configuration profiles; and
in response a mismatch between the candidate configuration profile and the one or more previously employed configuration profiles, generating another report that includes information associated with the mismatch.

9. The method of claim 1, further comprising:
displaying, in the user interface, a report for the one or more updated network policies, wherein the report includes one or more interactive visualizations that display one or more representations of the one or more network resources.

10. The method of claim 1, wherein the statement further comprises:
one or more task descriptions for the management of the one or more network resources.

11. A network computer for managing one or more network resources, comprising:
a memory that stores at least instructions; and
one or more processors that execute instructions that are configured to cause actions, including:
displaying a user interface that displays a statement, provided by a user, for management of the one or more network resources, wherein a policy statement for the management of the one or more network resources is generated based on the statement;

generating a prompt dataset for one or more large language models based on the policy statement and a prompt template, wherein the prompt template includes one or more of a field name, an exemplar field value, an exemplar policy statement, or an exemplar configuration profile; and in response to providing the prompt dataset to train the one or more large language models, performing further actions, including:

generating a candidate configuration profile based on information provided by the one or more trained large language models, wherein the candidate configuration profile includes one or more field names and one or more field values associated with the management of the one or more network resources; and in response to validation of the candidate configuration profile for the management of the one or more network resources, providing the validated candidate configuration profile to an infrastructure security computer (ISC), wherein the ISC updates one or more network policies based on the validated candidate configuration profile.

12. The network computer of claim 11, wherein the one or more processors execute instructions that are configured to cause actions, further comprising:

in response to invalidation of the candidate configuration profile for the management of the one or more network resources, the one or more trained large language models are retrained with one or more other candidate configuration profiles based on one or more other prompt datasets generated with one or more other policy statements associated with one or more other statements provided by the user; and in response to validation of the one other candidate configuration profiles for the management of the one or more network resources, providing the validated other candidate configuration profile to the infrastructure security computer (ISC), wherein the ISC updates the one or more network policies based on the validated other candidate configuration profile.

13. The network computer of claim 11, wherein providing the statement further comprises:

providing one or more of a text statement or an audio statement from the user to the user interface;

determining one or more reserved words or reserved characters included in the statement based on one or more of a heuristic, a pattern match, natural language processing (NLP), or a machine learning model.

14. The network computer of claim 11, wherein the one or more processors execute instructions that are configured to cause actions, further comprising:

comparing the policy statement to one or more previously employed policy statements; and in response to the policy statement matching the one or more previously employed policy statements, performing additional actions, including:

determining one or more previously employed configuration profiles that correspond to the one or more matched policy statements; and providing the one or more previously employed configuration profiles to the ISC.

15. The network computer of claim 11, wherein the one or more processors execute instructions that are configured to cause actions, further comprising:

generating one or more metrics associated with the one or more large language models, wherein the one or more metrics are modified based on the validation of the candidate configuration profile or invalidation of the candidate configuration profile; and in response to the one or more metrics having a value below a threshold value, generating one or more notifications associated with the one or more large language models that correspond to the one or more metrics that have a value below the threshold value.

16. The network computer of claim 11, wherein the one or more processors execute instructions that are configured to cause actions, further comprising:

generating one or more metrics associated with the prompt template, wherein the one or more metrics are modified based on the validation or invalidation of the candidate configuration profile; and in response to the one or more metrics having a value below a threshold value, generating one or more notifications that indicate that the prompt template is deficient.

17. The network computer of claim 11, wherein determining the prompt template, further comprises:

determining one or more characteristics associated with the one or more network resources, wherein the one or more characteristic include one or more of a resource class, a user role, an application type, or a geographic region; and determining the prompt template from a plurality of stored prompt templates based on the one or more characteristics.

18. The network computer of claim 11, wherein the one or more processors execute instructions that are configured to cause actions, further comprising:

comparing the policy statement to one or more previously employed policy statements; and in response to the policy statement matching the one or more previously employed policy statements, performing additional actions, including:

determining one or more previously employed configuration profiles that correspond to the one or more matched policy statements;

comparing the candidate configuration profile to the one or more previously employed configuration profiles; and in response to a mismatch between the candidate configuration profile and the one or more previously employed configuration profiles, generating another report that includes information associated with the mismatch.

19. The network computer of claim 11, wherein the one or more processors execute instructions that are configured to cause actions, further comprising:

displaying, in the user interface, a report for the one or more updated network policies, wherein the report includes one or more interactive visualizations that display one or more representations of the one or more network resources.

20. The network computer of claim 11, wherein the statement further comprises:

one or more task descriptions for the management of the one or more network resources.

21. A processor readable non-transitory storage media that includes instructions configured for managing one or more network resources over a network, wherein execution of the instructions by one or more processors on one or more network computers performs actions, comprising:

displaying a user interface that displays a statement, provided by a user, for management of the one or more network resources, wherein a policy statement for the management of the one or more network resources is generated based on the statement;

generating a prompt dataset for one or more large language models based on the policy statement and a prompt template, wherein the prompt template includes one or more of a field name, an exemplar field value, an exemplar policy statement, or an exemplar configuration profile; and in response to providing the prompt dataset to train the one or more large language models, performing further actions, including:

generating a candidate configuration profile based on information provided by the one or more trained large language models, wherein the candidate configuration profile includes one or more field names and one or more field values associated with the management of the one or more network resources; and in response to validation of the candidate configuration profile for the management of the one or more network resources, providing the validated candidate configuration profile to an infrastructure security computer (ISC), wherein the ISC updates one or more network policies based on the validated candidate configuration profile.

22. The media of claim 21, further comprising:
in response to invalidation of the candidate configuration profile for the management of the one or more network resources, the one or more trained large language models are retrained with one or more other candidate configuration profiles based on one or more other prompt datasets generated with one or more other policy statements associated with one or more other statements provided by the user; and in response to validation of the one other candidate configuration profiles for the management of the one or more network resources, providing the validated other candidate configuration profile to the infrastructure security computer (ISC), wherein the ISC updates the one or more network policies based on the validated other candidate configuration profile.

23. The media of claim 21, wherein providing the statement further comprises:
providing one or more of a text statement or an audio statement from the user to the user interface;
determining one or more reserved words or reserved characters included in the statement based on one or more of a heuristic, a pattern match, natural language processing (NLP), or a machine learning model.

24. The media of claim 21, further comprising:
comparing the policy statement to one or more previously employed policy statements; and
in response to the policy statement matching the one or more previously employed policy statements, performing additional actions, including:
determining one or more previously employed configuration profiles that correspond to the one or more matched policy statements; and providing the one or more previously employed configuration profiles to the ISC.

25. The media of claim 21, further comprising:
generating one or more metrics associated with the one or more large language models, wherein the one or more metrics are modified based on the validation of the candidate configuration profile or invalidation of the candidate configuration profile; and in response to the one or more metrics having a value below a threshold value, generating one or more notifications associated with the one or more large language models that correspond to the one or more metrics that have a value below the threshold value.

26. The media of claim 21, further comprising:
generating one or more metrics associated with the prompt template, wherein the one or more metrics are modified based on the validation or invalidation of the candidate configuration profile; and in response to the one or more metrics having a value below a threshold value, generating one or more notifications that indicate that the prompt template is deficient.

27. The media of claim 21, wherein determining the prompt template, further comprises:
determining one or more characteristics associated with the one or more network resources, wherein the one or more characteristic include one or more of a resource class, a user role, an application type, or a geographic region; and determining the prompt template from a plurality of stored prompt templates based on the one or more characteristics.

28. The media of claim 21, further comprising:
comparing the policy statement to one or more previously employed policy statements; and
in response to the policy statement matching the one or more previously employed policy statements, performing additional actions, including:
determining one or more previously employed configuration profiles that correspond to the one or more matched policy statements;
comparing the candidate configuration profile to the one or more previously employed configuration profiles; and
in response a mismatch between the candidate configuration profile and the one or more previously employed configuration profiles, generating another report that includes information associated with the mismatch.

29. The media of claim 21, further comprising:
displaying, in the user interface, a report for the one or more updated network policies, wherein the report includes one or more interactive visualizations that display one or more representations of the one or more network resources.

30. The media of claim 21, wherein the statement further comprises:
one or more task descriptions for the management of the one or more network resources.

* * * * *